US012766627B2

(12) United States Patent
Jogdand et al.

(10) Patent No.: US 12,766,627 B2
(45) Date of Patent: Oct. 20, 2026

(54) SYSTEMS AND METHODS FOR SEPARATING CONSUMABLES UNDER PRESSURE IN A PLASMA ARC TORCH

(71) Applicant: Hypertherm, Inc., Hanover, NH (US)

(72) Inventors: Harshawardhan Jogdand, Lebanon, NH (US); Girish Kamath, Lebanon, NH (US); Oliver Murphy, Hartland, VT (US); Raifer Allen, Perkinsville, VT (US); Craig Michael Felch, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 1552 days.

(21) Appl. No.: 16/952,806

(22) Filed: Nov. 19, 2020

(65) Prior Publication Data

US 2021/0146468 A1 May 20, 2021

Related U.S. Application Data

(60) Provisional application No. 62/940,039, filed on Nov. 25, 2019, provisional application No. 62/937,537, filed on Nov. 19, 2019.

(51) Int. Cl.
*B23K 10/00* (2006.01)
*H05H 1/28* (2006.01)
*H05H 1/34* (2006.01)

(52) U.S. Cl.
CPC ............... *B23K 10/00* (2013.01); *H05H 1/28* (2013.01); *H05H 1/3405* (2013.01); *H05H 1/3421* (2021.05)

(58) Field of Classification Search
CPC . B23K 10/00; H05H 1/26; H05H 1/28; H05H 1/32; H05H 1/3405; H05H 1/3421; H05H 1/3436; H05H 1/3489; H05H 1/34
USPC ............ 219/121.39, 121.36, 121.48, 121.49, 219/121.51, 121.52
See application file for complete search history.

(56) References Cited

U.S. PATENT DOCUMENTS

| | | | |
|---|---|---|---|
| 2,898,441 | A | 8/1959 | Reed et al. |
| 3,242,305 | A | 3/1966 | Kane et al. |
| 4,791,268 | A | 12/1988 | Sanders et al. |

(Continued)

FOREIGN PATENT DOCUMENTS

| | | | |
|---|---|---|---|
| EP | 1599075 | B1 | 4/2014 |
| FR | 3019707 | A1 | 4/2014 |

*Primary Examiner* — Steven W Crabb
*Assistant Examiner* — Alba T Rosario-Aponte
(74) *Attorney, Agent, or Firm* — Cesari and McKenna, LLP

(57) ABSTRACT

A contact start liquid-cooled plasma arc cutting torch is provided that includes a translatable liquid-cooled electrode, a nozzle, and a multi-piece cathode. The electrode comprises an electrode body defining a proximal end and a distal end along a longitudinal axis of the electrode body. The electrode body includes a coolant cavity configured to receive at least a portion of a coolant tube of the torch for directing a liquid coolant flow distally through the coolant tube within the coolant cavity. The cathode is disposed about the proximal end of the electrode body and includes a first body shaped to matingly engage the electrode and a second body shaped to matingly engage the torch. The first body slidingly engages the second body such that the first body and the electrode are axially translatable relative to the second body along the longitudinal axis.

20 Claims, 10 Drawing Sheets

(56) References Cited

U.S. PATENT DOCUMENTS

| | | | | |
|---|---|---|---|---|
| 5,208,441 | A | 5/1993 | Brogerg | |
| 5,409,164 | A * | 4/1995 | Delzenne | H05H 1/34<br>239/132.3 |
| 5,796,067 | A | 8/1998 | Enyedy et al. | |
| 5,897,795 | A | 4/1999 | Lu et al. | |
| 6,703,581 | B2 | 3/2004 | Jones et al. | |
| 8,089,025 | B2 | 1/2012 | Sanders | |
| 8,258,423 | B2 | 9/2012 | Severance, Jr. et al. | |
| 8,633,414 | B2 | 1/2014 | Severance, Jr. et al. | |
| 9,492,883 | B2 | 11/2016 | Mather et al. | |
| 2004/0200809 | A1 | 10/2004 | MacKenzie et al. | |
| 2006/0289398 | A1 * | 12/2006 | Cook | H05H 1/3405<br>219/121.5 |
| 2007/0045241 | A1 | 3/2007 | Schneider et al. | |
| 2011/0031224 | A1 * | 2/2011 | Severance, Jr. | H05H 1/34<br>219/121.52 |
| 2012/0031881 | A1 * | 2/2012 | Griffin | H05H 1/34<br>219/121.5 |
| 2015/0129562 | A1 * | 5/2015 | Severance, Jr. | H05H 1/3423<br>219/121.48 |
| 2017/0042015 | A1 | 2/2017 | Mather et al. | |
| 2017/0280547 | A1 * | 9/2017 | Mitra | H05H 1/34 |
| 2018/0368246 | A1 | 12/2018 | Raymond et al. | |

* cited by examiner

SYSTEMS AND METHODS FOR SEPARATING CONSUMABLES UNDER PRESSURE IN A PLASMA ARC TORCH

CROSS REFERENCE TO RELATED APPLICATION

This application claims the benefit of and priority to U.S. Provisional Patent Application Nos. 62/937,537, filed on Nov. 19, 2019, and 62/940,039, filed on Nov. 25, 2019, the entire content of both of which are owned by the assignee of the instant application and incorporated herein by reference in their entirety.

TECHNICAL FIELD

The present invention relates generally to a contact-start, liquid-cooled plasma arc cutting torch, and, more particularly, to separating various consumables under pressure in such a torch to generate and sustain a plasma arc during cutting operations.

BACKGROUND

Plasma arc torches are widely used for high temperature processing (e.g., cutting, welding, and marking) of metallic materials. A plasma arc torch generally includes a torch body, an electrode mounted within the body, an emissive insert disposed within a bore of the electrode, a nozzle with a central exit orifice, a shield, electrical connections, passages for cooling and arc control fluids, a swirl ring to control the fluid flow patterns, and a power supply. The plasma arc torch can produce a plasma arc, which is a constricted, ionized jet of plasma gas with high temperature and high momentum. Gases used in the torch can be non-reactive (e.g., argon or nitrogen) or reactive (e.g., oxygen or air).

A plasma arc torch can generate a plasma arc using a contact start method. This involves first operating the torch in a pilot arc mode, which includes establishing physical contact and electrical communication between the electrode and the nozzle, e.g., by using a biasing force from, for example, a spring. A current path and a small pilot arc current flow are established between the electrode and the nozzle while they are biased together. A plasma gas is introduced into a plasma chamber between the nozzle and the electrode, such that gas pressure builds up in the plasma chamber to break the physical contact between the electrode and the nozzle to separate the two components. The separation causes an electrical arc to be created in the gap between the electrode and the nozzle in the plasma chamber. The electrical arc ionizes the flowing plasma gas in the plasma chamber to produce a plasma arc (i.e., a pilot arc). The plasma gas can be passed through a swirl ring to impart a tangential motion to the gas as it passes through the torch, thereby improving torch performance. This plasma gas is adapted to push the plasma arc toward the front of the nozzle. Next, in a transferred arc mode, the torch is moved near a grounded workpiece and the plasma arc makes contact with the workpiece by extending through the nozzle bore. Upon contact, the current return path transfers from the nozzle to the workpiece, which means that the electrical return path from the nozzle is opened (i.e., electrically disconnected) and the current returns from the workpiece back to the power supply. During transferred arc mode, the current flow can be increased to a larger amount such that the arc generated processes (e.g., gouges, pierces or cuts) the workpiece.

Even though the contact start approach for generating a plasma arc can significantly reduce electromagnetic interference and other electrical noises, this approach is typically employed in air-cooled, light industrial (e.g., handheld) plasma cutting torches with limited usage in heavy industrial settings. This is because heavy industrial (e.g., mechanized) plasma cutting torches are often exposed to high heat loads during torch operations, which necessitates a complex coolant path design to accommodate high-pressure, convective liquid cooling. A contact start approach generally cannot overcome the high coolant pressure (e.g., about 160 PSI to about 180 PSI) in heavy industrial plasma cutting torches without jeopardizing torch functions, such as being able to maintain proper alignment of consumable components, minimize leakage potential and maintain cut quality. Instead, a heavy industrial plasma cutting torch typically uses a high voltage, high frequency (HVHF) circuit, such as a Tesla coil ignition circuit, to generate a plasma arc. One disadvantage of this approach is that the HVHF circuit produces very high levels of electromagnetic interference and/or noises during plasma arc initiation, which can cause many unintended harms that lead to customer complaints and delays in project timelines.

SUMMARY

The present invention provides contact start techniques and related apparatus for generating plasma arc in liquid-cooled plasma arc torches, such as in heavy industrial plasma cutting torches that can be characterized by an operating current of above about 130 amps, employment of forced convective cooling using a liquid coolant, having complex cooling paths formed by torch and consumable geometries, and used in multiple processes with different gases (not limited to air). In some embodiments, contact start of a plasma arc torch of the present invention is repeatedly and controllably achieved by manipulating two fluids (e.g., one liquid and one gas) to actuate certain torch components, such as drive an electrode to contact and separate from a nozzle. The designs of the present invention can significantly reduce electromagnetic interferences and electrical noises in the torch and system, which in turn produce a number of benefits including reducing the impact of noise on performance of other torch equipment, reducing the need for shielding and/or filtering components, and expanding design space to accommodate new functionalities (e.g., torch, consoles, sensors and radio-frequency identification tags) to enhance automation. Other benefits include reducing cost, weight and size of various torch components (e.g., the consoles and leads), reducing spacing between power and control harness at the system level, and reducing product development timelines and costs. These benefits ultimately facilitate operation and integration, thus improving customer satisfaction. In some embodiments, certain aspects of the present contact start techniques and apparatus described herein can be adapted to air-cooled (e.g., light industrial) plasma cutting systems.

The invention, in one aspect, features a contact start liquid-cooled plasma arc cutting torch. The torch includes a translatable liquid-cooled electrode having an electrode body defining a proximal end and a distal end along a longitudinal axis of the electrode body. The electrode body includes a coolant cavity with a distal internal coolant surface disposed at the distal end of the electrode body. The coolant cavity is configured to receive at least a portion of a coolant tube of the torch for directing a liquid coolant flow distally through the coolant tube within the coolant cavity and toward the distal internal coolant surface of the electrode. The distal internal coolant surface is shaped to substantially redirect the liquid coolant flow proximally over an exterior surface of the coolant tube within the coolant cavity. The torch also includes a nozzle disposed about the distal end of the electrode body. The torch further includes a multi-piece cathode disposed about the proximal end of the electrode body. The cathode comprising a first body shaped to matingly engage the electrode and a second body shaped to matingly engage the torch. The first body slidingly engages the second body such that the first body and the electrode are axially translatable relative to the second body along the longitudinal axis.

In another aspect, the present invention features a multi-piece torch cathode for a contact start liquid-cooled plasma arc torch. The multi-piece torch cathode comprises a first body including a cavity configured to receive and matingly engage an electrode. The multi-piece torch cathode also comprises a second body disposed within the torch. The first body slidingly engages the first body and axially translates relative to the second body during an operation of the plasma arc torch.

Any of the above aspects can include one or more of the following features. In some embodiments, the axial translation of the electrode relative to the second body biases the electrode relative to the nozzle at the distal end of the electrode. In some embodiments, the torch includes a gas input port for receiving and supplying a biasing gas to the torch. The biasing gas is adapted to create a blowback pressure on the first body of the cathode to axially translate the first body into an abutting position with the second body, thereby axially translating the electrode away from the nozzle. In some embodiments, the axial translation of the electrode is independent of a plasma gas flow through the torch.

In some embodiments, the liquid coolant flow in the coolant cavity of the electrode body is adapted to create a forward biasing pressure on the electrode to axially translate the electrode toward the nozzle, thereby axially translating the first body away from the second body of the cathode. In some embodiments, the forward biasing pressure is greater than the blowback pressure. In some embodiments, a lateral surface of the first body directly exposed to the blow-back pressure has a surface area that is greater than a surface area of the internal coolant surface of the electrode directly exposed to the forward biasing pressure. The lateral surface of the first body and the internal coolant surface of the electrode are substantially orthogonal to the longitudinal axis.

In some embodiments, the torch includes a sealed pressurization chamber having a first portion defined by a blowback flange of the first body of the cathode. In some embodiments, the blowback flange includes a first surface exposed to a biasing gas flow for urging the first body into an abutting position relative to the second body. In some embodiments, the sealed pressurization chamber is pressurized by the biasing gas received from a gas port disposed in the torch. In some embodiments, a pressure of the liquid coolant flow against the distal internal coolant surface of the electrode is greater than a pressure of the biasing gas flow. For example, the pressure of the liquid coolant flow is about 40% great that the pressure of the biasing gas flow. In some embodiments, a surface area of the first surface of the blowback flange is greater than a surface area of the distal internal coolant surface.

In some embodiments, the sealed pressurization chamber has a second portion defined by one of a swirl ring or a plasma chamber cover. In some embodiments, the plasma chamber cover and the swirl ring form a unitary structure.

In some embodiments, the cathode includes a set of one or more anti-rotation features located between the first and second bodies to prevent a radial movement of the first and second bodies relative to each other. In some embodiments, the set of one or more anti-rotation features comprises a set of one or more male shoulder sections of the first body and a set of one or more female shoulder sections of the second body. The male shoulder sections are configured to matingly engage the corresponding female shoulder sections.

In some embodiments, the first body of the cathode includes a set of one or more threads to matingly engage the electrode. In some embodiments, the torch includes an electrical contact disposed between the first and second bodies of the cathode. In some embodiments, the electrical contact comprises a canted coil spring. In some embodiments, the electrical contact is configured to pass substantially all of a pilot arc current between the first and second bodies during a pilot arc mode of torch operation.

In yet another aspect, the present invention features a method for contact starting a liquid-cooled plasma arc torch that comprises an electrode, a nozzle disposed about a distal end of the electrode, and a multi-piece cathode disposed about a proximal end of the electrode. The method includes supplying a coolant flow to the electrode, where the coolant flow is adapted to exert a first pressure on a surface of the electrode thereby biasing the electrode into physical contact with the nozzle. The method also includes establishing a torch current flow between the electrode and the nozzle that is a pilot current flow and supplying a plasma cutting gas to a plenum of the torch. The method additionally includes supplying a biasing gas to a sealed pressurization chamber of the torch. The biasing gas is adapted to create a second pressure in the sealed pressurization chamber that biases the electrode away from the nozzle thereby initiating a plasma arc using the plasma cutting gas in the plenum. The method further includes transferring the torch current flow from the nozzle to the workpiece while cutting the workpiece with the plasma arc.

In some embodiments, the biasing of the electrode into physical contact with or away from the nozzle is independent of the plasma cutting gas flow through the torch. In some embodiments, the coolant flow is supplied to the electrode via a coolant tube inserted into a cavity of the electrode, where the cavity comprises a distal coolant surface adapted to be directly exposed to the first pressure.

In some embodiments, the sealed pressurization chamber is located proximal to the plenum. In some embodiments, a portion of the sealed pressurization chamber is defined by a biasing flange of a first body of the multi-piece cathode. The first body is fixedly attached to the electrode and translatable relative to a stationary second body of the cathode. The first body is disposed distal to the second body.

In some embodiments, the method further includes exerting the second pressure against a biasing surface of the biasing flange of the first body to translate the first body proximally into physical contact with the first body, thereby translating the electrode proximally away from the nozzle. In some embodiments, a first area of the distal coolant surface is smaller than a second area of the biasing surface of the biasing flange. In some embodiments, the first pressure of the coolant flow against the distal coolant surface is greater than the second pressure of the biasing gas against the biasing surface.

In some embodiments, the method further includes ramping down the supply of the biasing gas for operating the torch to enable the first pressure exerted on the electrode to translate the first body away from the second body of the cathode and allow the electrode to physically contact the nozzle in preparation for a next start of the torch. In some embodiments, the method further includes passing substantially all of the pilot current flow via a dynamic electrical contact located between the first and second bodies of the cathode.

In yet another aspect, the present invention features a contact start liquid-cooled plasma arc cutting torch comprising a consumable torch head including a nozzle, an electrode, a coolant tube and a cathode. The torch also includes a receptacle connected to a proximal end of the torch head. The receptacle is configured to controllably supply a liquid coolant and one or more gases to the cutting head. The receptacle includes a coolant valve interface for providing a supply of the liquid coolant to the coolant tube, where the liquid coolant is configured to cool the torch head while exerting a forward pressure configured to bias the electrode toward the nozzle. The receptacle also includes a first gas valve for regulating a supply of a plasma cutting gas to a plenum located between the electrode and the nozzle of the torch head, the plasma cutting gas adapted to create a plasma arc for cutting a workpiece. The receptacle further includes a second gas valve for regulating a supply of a biasing gas to a pressurization chamber located adjacent to the cathode of the torch head. The biasing gas is adapted to create a backward pressure in the pressurization chamber to bias the electrode away from the nozzle.

In some embodiments, the coolant valve interface is adapted to supply the liquid coolant to the coolant tube during both a transferred arc mode and a pilot arc mode for operating the torch. In some embodiments, the second gas valve for regulating the biasing gas supply is adapted to be closed or ramped down for at least a portion of a time duration when operating the torch.

In some embodiments, the torch further includes a volume disposed in the receptacle for storing a radio-frequency identification (RFID) tag. The RFID tag is configured to store at least one of consumable identification information, consumable usage history or process parameters.

In some embodiments, the biasing gas comprises a nitrogen gas.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
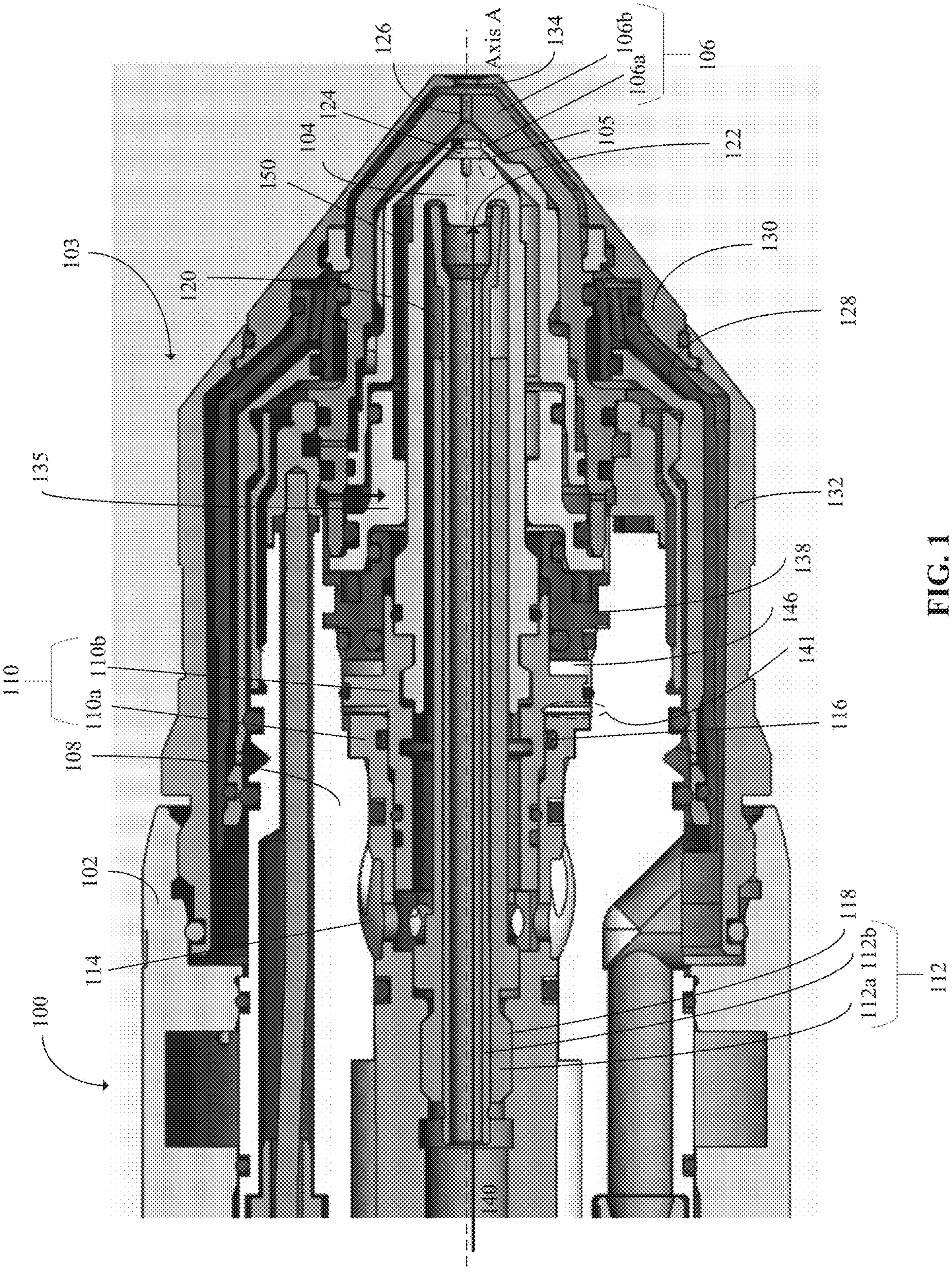
FIG. 1 shows a cross-sectional view of an exemplary contact start, liquid-cooled plasma arc cutting torch operated in a position where the electrode is in contact with the nozzle of the torch, according to some embodiments of the present invention.
Figure 2:
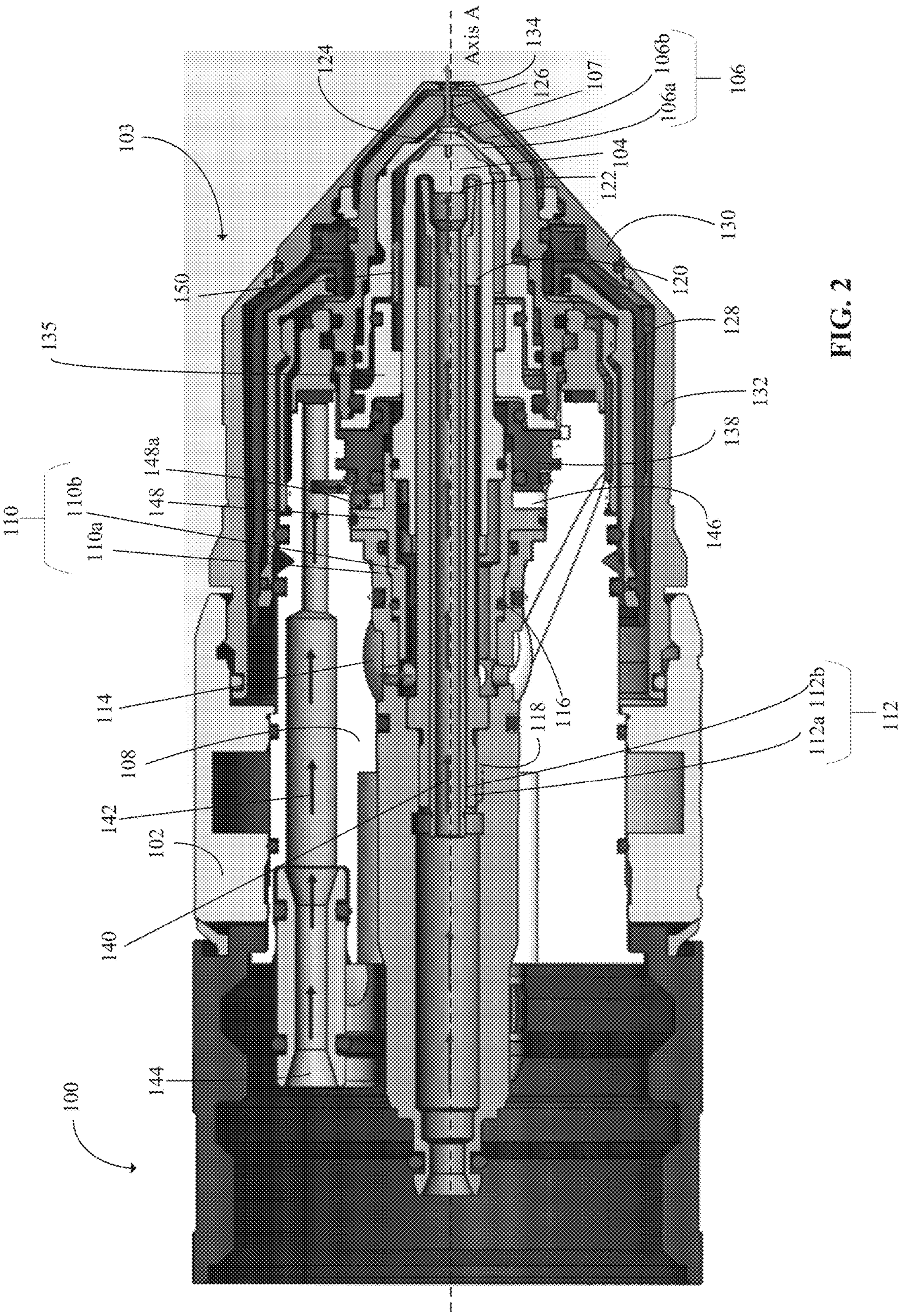
FIG. 2 shows the contact start, liquid-cooled plasma arc cutting torch of FIG. 1 operated in a position where the electrode is biased away from the nozzle of the torch, according to some embodiments of the present invention.

FIG. 1 shows a cross-sectional view of an exemplary contact start, liquid-cooled plasma arc cutting torch 100 operated in a position where the electrode 104 is in contact with the nozzle 106 of the torch 100 at a physical interface 105, according to some embodiments of the present invention. FIG. 2 shows the same torch 100 operated in a position where the electrode 104 is biased proximally away from the nozzle 106, thereby generating a gap 107 between electrode 104 and nozzle 106, according to some embodiments of the present invention. In general, the plasma arc cutting torch 100 of FIGS. 1 and 2 defines a central longitudinal axis A along which a torch body 102 is connected to a torch tip 103 comprising a number of consumable components including the electrode 104 and the nozzle 106. Hereinafter, a proximal end of a component of the torch 100 is defined as a region of the component along the longitudinal axis A that is away from a workpiece (not shown) when the torch 100 is used to process the workpiece, and a distal end of the torch component is defined as a region of the component that is opposite of the proximal end and close to the workpiece when the torch 100 is used to process the workpiece.

The torch body 102 can include a torch insulator 108 configured to support a multi-piece cathode 110 and a coolant tube 112 with a portion of which disposed in the torch insulator 108. The cathode 110 and coolant tube 112 may or may not be consumables of the plasma arc torch 100. In some embodiments, the torch insulator 108 of the torch body 102 is made from an electrically insulating material and includes a central main channel 114 that extends along and substantially disposed about the central longitudinal axis A. The main channel 114 can be configured to house at least a portion of the multi-piece cathode 110. As shown, the cathode 110 can extend within the main channel 114 along a portion of the length of the torch insulator 108. The cathode 110 can include two distinct bodies comprising a proximal cathode body **110*a* and a distal cathode body 110*b*. The proximal cathode body 110*a* is shaped and configured to matingly engage the torch body 102, such as to fixedly engage a surface of the main channel 114 in the torch insulator 108 of the torch body 102. One or more torch locking components (e.g., threads or O-ring seals) can be used to secure an external surface of the proximal cathode body 110*a* of the cathode 110 to the main channel 114 inside of the torch insulator 108. The distal cathode body 110*b* is shaped and configured to matingly engage the electrode 104. For example, one or more electrode locking components (e.g., threads or O-rings) can be used to fixedly engage an interior surface of the distal cathode body 110*b* to an exterior surface of the proximal end of the electrode 104. In some embodiments, the proximal and distal cathode bodies 110*a*, 110*b* are made from an electrically conductive material, such as brass and/or copper. Further, the distal cathode body 110*b* can slidingly engage the proximal cathode body 110*a* such that the distal body 110*b* and the electrode 104 are axially translatable relative to the proximal body 110*a* along the longitudinal axis A. In some embodiments, the multi-piece cathode 110 further includes a resilient element 116 (e.g., a canted coil spring) that is disposed and connected between the proximal and distal bodies 110*a*, 110*b* of the cathode 110 to minimize friction during the axial translation of these bodies relative to each other. In addition, the resilient element 116 can be conductive to provide a consistent electrical contact between the two bodies 110*a*, 110*b* during their relative movement. Details regarding the connections among the cathode bodies 110*a* and 110*b*, the torch insulator 108 and the electrode 104 are explained below with reference to FIG. 4**.

In some embodiments, the interconnection of the distal cathode body **110*b* of the cathode 110, the proximal cathode body 110*a* of the cathode 110, and the electrode 110 defines a housing within which the coolant tube 112 is encased. Specifically, as shown in FIGS. 1 and 2, the proximal body 110*a* of the cathode 110 can physically couple to the proximal end of the coolant tube 112 within the main channel 114 of the torch insulator 108. For example, the coolant tube 112 can include one or more threads 118 at its proximal end to form a threaded connection between an outer surface of the coolant tube 112 and an inner surface of the proximal cathode body 110*a*. Thus, at least a proximal portion of the coolant tube 112 is inserted within the cathode 110. Additionally, as shown in FIGS. 1 and 2, at least a distal portion of the coolant tube 112 is disposed in a coolant cavity 120 of the electrode 104. The electrode 104 generally comprises an electrode body defining a proximal end and a distal end along the longitudinal axis A. The coolant cavity 120 is disposed in the electrode body 104 and is open from the proximal end of the electrode body 104 to receive the coolant tube 112. The coolant cavity 120 also has a distal internal coolant surface 122 disposed at the distal end of the electrode body 104, where the distal internal coolant surface 122 is substantially orthogonal to the longitudinal axis A. Upon insertion of the coolant tube 112 within the coolant cavity 120, the coolant tube 112 is adapted to direct a liquid coolant flow 140 distally through the coolant tube 112 within the coolant cavity 120 and toward the distal internal coolant surface 122, which is configured to substantially redirect the liquid coolant flow proximally back over an exterior surface of the coolant tube 112 within the coolant cavity 120**.

In some embodiments, the coolant tube 112 is a multi-piece telescoping coolant tube. As shown, the coolant tube 112 comprises at least two pieces, a proximal piece **112*a* and a distal piece 112*b*. The distal coolant tube piece 112*b* is adapted to translate axially within the hollow boy of the proximal piece 112*a* in a telescoping fashion, while the proximal piece 112*a* is fixedly engaged to the torch insulator 108. For example, the proximal piece 112*a* of the coolant tube 112 can be fixedly engaged to the main channel 114 of the torch insulator 108 via a threaded connection comprising the one or more threads 118 disposed on an exterior surface of the proximal piece 112*a* of the coolant tube 112. An advantage of using the multi-piece telescoping coolant tube 112 is that it improves consumable alignment, where the close tolerance of the proximal piece 112*a* acts as a guide post for the electrode 104** during torch operations.

In some embodiments, the nozzle 106 is disposed about the distal end of the electrode body 104 and is circumferentially spaced from the electrode body 104 to define a plenum region 124 therebetween. The nozzle 106 can include a central nozzle exit orifice 126 for expelling a plasma arc, such a as an ionized gas jet, for processing (e.g., cutting) a workpiece or for allowing pre-flow gases to expel from the plenum region 124 prior to electrode nozzle separation (e.g., pilot arc formation). In some embodiments, the nozzle 106 is a two-piece nozzle that includes an inner nozzle liner **106*a* substantially surrounded by a nozzle body 106*b*. Thus, in this configuration, physical contact between the electrode 104 and the nozzle 106 occurs at an interface 105 between the electrode 104 and the inner nozzle liner 106*a*. Alternatively, in embodiments where the inner nozzle liner 106*a* is absent (i.e., the nozzle 106 is a one-piece structure), the physical interface occurs between the electrode 104 and the nozzle body 106*b*. In some embodiments, the torch tip 103 includes an inner retaining cap 128 securely connected (e.g., threaded) to the torch body 102 to retain the nozzle 106 to the torch body 102 as well as radially and/or axially position the nozzle 106 with respect to the longitudinal axis A. In some embodiments, the torch tip 103 includes a shield 130 that is secured (e.g., threaded) to the torch body 102 via an outer retaining cap 132. The shield 130 includes a shield exit orifice 134, which in combination with the nozzle exit orifice 126**, define a plasma arc exit orifice through which a plasma arc is delivered to a workpiece during torch operation.

In some embodiments, the torch tip 103 includes a swirl ring 135 mounted around the electrode 104. The swirl ring 135 can have a set of radially and/or axially offset (or canted) gas distribution holes configured to impart a tangential and/or parallel velocity component to a plasma gas flow, thereby causing the plasma gas flow to swirl. This swirl creates a vortex that constricts the arc and stabilizes the position of the arc on the electrode 104. In some embodiments, the torch tip 103 includes a chamber cover 138 configured to provide a substantially fluid proof seal of the plenum region 124 by bridging the gap between the cathode 110 and the swirl ring 135. For example, as shown in FIGS. 1 and 2, the chamber cover 138 can be fixedly positioned within the torch 100 by being matingly attached to both the main channel 114 of the torch insulator 108 and the swirl ring 135 via, for example, threaded connections, O-rings, interference fits, etc. The chamber cover 138 can also be slideably engaged to the distal cathode body 110*b* such that the distal cathode body 110*b* axially translates relative to the chamber cover 138 when the electrode 104 is biased into or away from the nozzle 106. In some embodiments, the chamber cover 138 and the swirl ring 135 form an integral structure, where the chamber cover 138 becomes a part of the swirl ring 135. The integration of the chamber cover 138 and the swirl ring 135 is described in further detail below with respect to FIG. 7. In some embodiments, the chamber cover 138 and/or the swirl ring 135 are made of an electrical insulating material, such as Vespel, Torlon, thermoplastics or Lava.

In general, a contact start approach can be used to generate a plasma arc in the torch 100 for heavy industrial plasma cutting, while the torch 100 is being liquid cooled to remove excess heat from the torch consumables. In operation, the liquid coolant flow 140 is provided from the torch body 102 to the coolant tube 112 connected thereto. Exemplary liquid coolant includes water, propylene glycol, ethylene glycol, or any number of commercially available coolants designed for plasma cutting systems. For example, a liquid coolant can comprise about 30% propylene glycol and about 70% water. The coolant tube 112 conducts the coolant flow 140 to the electrode 104 to cool the torch tip 103. A typical pressure exerted by the coolant flow 140 on entry to the coolant tube 112 in the distal direction is about 160 pounds per square inch (PSI) to about 180 PSI. While flowing through the coolant tube 112 within the coolant cavity 120 of the electrode body 104, the coolant flow 140 is adapted to exert a forward biasing force on a biasing surface of the electrode 104, such as on the distal internal coolant surface 122 of the electrode 104 as the coolant flow 140 exits from the coolant tube 112 within the cavity 120. In the absence of an equal or greater counter blowback force, this forward biasing force associated with the coolant flow 140 axially translates the electrode 104 in the distal direction toward the nozzle 106 until the electrode 104 physically contacts the nozzle 106 in the plenum region 124, at which position the distal movement of the electrode 104 is restrained by the nozzle 106. FIG. 1 illustrates this closed contact condition, which is needed to operate the plasma arc cutting torch in a pilot arc mode for contact starting the torch 100. As shown, the electrode 104 contacts the nozzle 106 at the inner nozzle liner 106*a* to form a substantially circumferential physical interface 105. In alternative embodiments, the electrode 104 makes contact with the nozzle body 106*b* when the inner nozzle liner 106*a* is absent. Therefore, the liquid coolant flow 140 is adapted to provide both cooling and forward biasing functions.

In some embodiments, the axial translation and biasing of the electrode 104 relative to the nozzle 106 at the distal end of the electrode 104 causes axial translation of the distal cathode body 110*b* relative to the proximal cathode body 110*a* at least because the distal cathode body 110*b* is coupled to the proximal end of the electrode 104. Specifically, in the pilot arc mode when the forward biasing force associated with the coolant flow 140 is greater than any counter blowback force (and the electrode 104 is being biased into physical contact with the nozzle 106), the distal body 110*b* of the cathode 110 is adapted to translate distally away from the relative stationary proximal body 110*a* of the cathode 110 to create an axial gap 141 between the two bodies, as illustrated in FIG. 1. In some embodiments, the separation of the proximal and distal cathode bodies 110*a*, 110*b* is adapted to deform the resilient element 116 connected therebetween, where the resilient element 116 serves as an electrical contact between the two bodies 110*a*, 110*b*, such as mostly during the axial translation of the two bodies relative to each other.

In the pilot arc mode where the electrode 104 is biased forward by the coolant flow 140 to physically contact the nozzle 106, a current flow path of a small pilot arc current is established between the nozzle 106 and the electrode 104. The pilot arc current can be between about 9 amps to about 60 amps. A flow of plasma gas 150 is also introduced to the plenum region 124 of the torch 100 between the electrode 104 and the nozzle 106. After establishing the pilot arc current, a blowback force is applied to a blowback surface of the torch 100 to break the physical contact between the electrode 104 and the nozzle 106 in the plenum region 124, at which point the pilot arc current induces a spark discharge in the plasma gas flow 150 in the resulting gap 107 in the plenum region 124. In some embodiments, the plasma gas flow 150 supplied to the plenum region 124 is also used to generate the blowback force to separate the contact between the electrode 104 from the nozzle 106, in which case the blowback surface is the distal end face of the electrode 104. Alternatively, in the plasma arc torch 100 of FIGS. 1 and 2, a separate biasing fluid independent of the plasma gas flow 150 is used to overcome/counterbalance the biasing effect of the coolant flow 140 and to actuate the separation between the electrode 104 and the nozzle 106 at the blowback surface 148*a* of the distal cathode body 110*b*. Details regarding this blowback surface 148 is provided below. FIG. 2 illustrates this open contact condition, where the electrode 104 is biased away from the nozzle 106 by a biasing fluid flow 142 that is adapted to exert a blowback pressure on the distal body 110*b* of the cathode 110 to generate a blowback force that axially translates the distal body 110*b* into an abutting position with the proximal body 110*a*. This causes the axial translation of the electrode 104 attached to the distal cathode body 110*b* to move away from the nozzle 106. In some embodiments, a biasing fluid input port 144, which is separate and distinct from the port for supplying the plasma gas flow 150 to the plenum region 124, is coupled to the torch 100, where the biasing fluid input port 144 is configured to receive and supply the biasing fluid (e.g., a gas or a liquid) to the torch 100. Thus, the biasing fluid flow 142 is independent of and/or in addition to the plasma gas flow 150. In some embodiments, the biasing fluid is a gas, such as a nitrogen gas.

In some embodiments, the biasing fluid is routed within the torch 100 along the fluid flow path 142 to pressurize a substantially sealed pressurization chamber 146 of the torch 100. The pressure exerted by the biasing fluid flow 142 in the sealed pressurization chamber 146 can be modulated to generate a blowback force that creates a non-equilibrium condition for separating the electrode 104 from the nozzle 106 in the plenum region 126. As shown in FIG. 2, the sealed pressurization chamber 146 is cooperatively defined by a blowback flange 148 of the distal cathode body 110*b*, a portion of the torch insulator 108 within which the cathode bodies 110*a*, 110*b* are disposed, and a portion of the chamber cover 138. Specifically, the pressurization chamber 146 is bounded proximally by the blowback flange 148, distally by the chamber cover 138, and radially by the torch insulator

108. As shown, the blowback flange 148 of the proximal cathode body 110*b* includes a lateral blowback surface 148*a* that is substantially orthogonal to the longitudinal axis A. In some embodiments, the chamber cover 138 and the swirl ring 135 form a unitary structure and the chamber cover 138 is a part of the swirl ring 135, in which case the pressurization chamber 146 is defined in part by the swirl ring 135 instead. In some embodiments, the sealed pressurization chamber 146 is defined by only the chamber cover 138 and distal cathode body 110*b* where either or both of chamber cover 138 and distal cathode body 110*b* include circumferential flanges that extend axially to shield the torch insulator 108 from the sealed pressurization chamber 146.

To bias the electrode 104 away from being in contact with the nozzle 106, the blowback force created by the biasing fluid flow 142 on the blowback surface 148*a* of the pressurization chamber 146 is larger than and in substantially opposite direction from the forward biasing force associated with the liquid coolant flow 140, which is defined as a non-equilibrium condition for operating the torch 100. To achieve this non equilibrium condition, the sealed pressurization chamber 146 is pressurized by the biasing fluid received from the fluid input port 144. Within the pressurization chamber 146, the surfaces of the pressurization chamber 146, including the lateral surface 148*a* of the blowback flange 148 of the distal cathode body 110*b*, are exposed to the biasing fluid flow 142 and the resulting pressure. As the fluid pressure in the pressurization chamber 146 builds, a distal blowback force is exerted on the blowback flange 148 of the slideable distal cathode body 110*b* to urge the distal cathode body 110*b* to translate into an abutting position with the proximal cathode body 110*a*. In some embodiments, the axial translation and biasing of the distal cathode body 110*b* causes an axial translation of the electrode 104 relative to the nozzle 106 in the plenum region 124 at least because the proximal end of the electrode 104 is coupled to the distal cathode body 110*b*. Specifically, when the blowback force is greater than the forward biasing force associated with the coolant flow 140 (and the distal cathode body 110*b* is biased into physical contact with the proximal cathode body 110*a*), the electrode 104 is adapted to translate proximally away from the relative stationary nozzle 106 to create the air gap 107 in the plenum region 124, as illustrated in FIG. 2. In some embodiments, the physical contact between the proximal and distal cathode bodies 110*a*, 110*b* is adapted to compress the resilient element 116 connected therebetween. In some embodiments the balance of the forces is impacted by a mechanical biasing force as well.

In some embodiments, even though the blowback force generated by the biasing gas flow 142 against a blowback surface is greater than the forward biasing force generated by the coolant flow 140 against a forward biasing surface, the pressure of the biasing gas flow 142 supplied to the torch 100 is less than the pressure of the coolant flow 140 supplied to the torch 100. For example, the pressure of the biasing gas flow 142 can be less than about 160 PSI, such as about 80 PSI to about 90 PSI, while the pressure of the coolant flow 140 is greater, such as about 160 PSI to about 180 PSI. In some embodiments, the blowback surface exposed to the biasing gas flow 142 is a surface of the distal cathode body 110*b*, such as the lateral surface 148*a* of the blowback flange 148 of the distal cathode body 110*b*. In some embodiments, the forward biasing surface exposed to the coolant flow 140 is a surface of the electrode 104, such as the distal internal coolant surface 122 of the electrode. The lower biasing fluid pressure can be achieved by configuring the surface area of the lateral surface 148*a* of the blowback flange 148 to be greater than the surface area of the distal internal coolant surface 122, where both surfaces 148*a*, 122 are substantially orthogonal to the longitudinal axis A. Since pressure is inversely proportional to the available surface area on which the pressure is applied, a larger surface area means a smaller pressure is required to achieve a desired force. In some embodiments, the pressure of the liquid coolant flow 140 is about 40% greater than the pressure of the biasing gas flow 142. In some embodiments, the surface area of the lateral surface 148*a* of the blowback flange 148 is about 40% greater than the surface area of the distal internal coolant surface 122.

Figure 3:
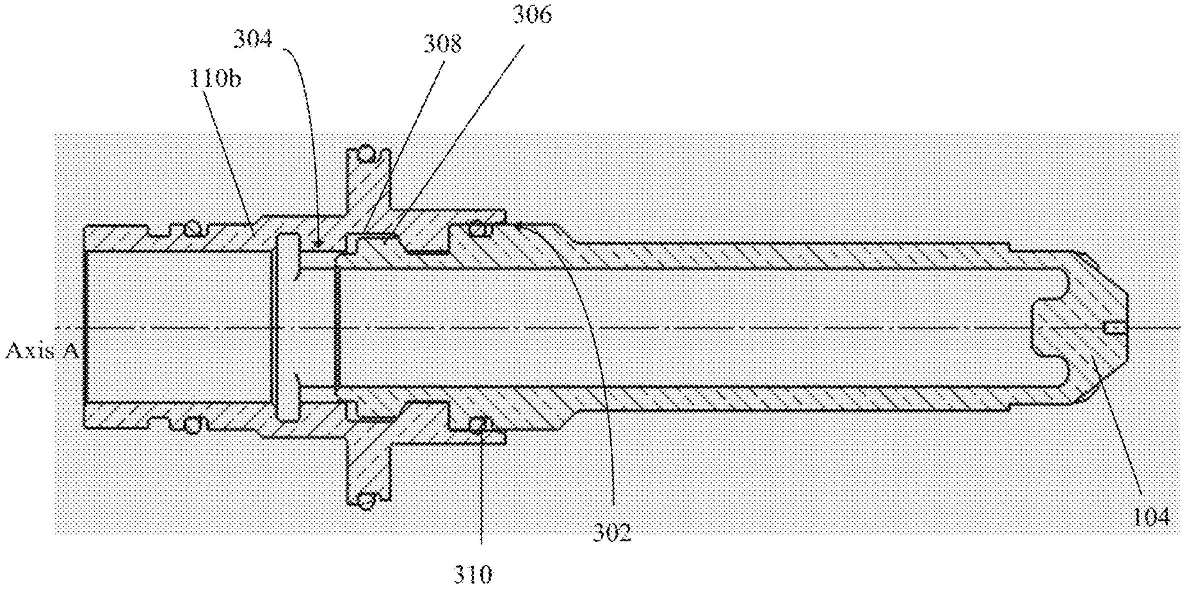
FIG. 3 shows an exemplary connection between the electrode and the distal body of the cathode of the plasma arc cutting torch of FIGS. 1 and 2, according to some embodiments of the present invention.

FIG. 3 shows an exemplary connection between the electrode 104 and the distal body 110*b* of the cathode 110 of the plasma arc cutting torch 100 of FIGS. 1 and 2, according to some embodiments of the present invention. As shown, the electrode 104 is fixedly attached to the translatable distal body 110*b* of the cathode 110 via a locking mechanism between an exterior surface 302 of the proximal end of the electrode 104 and an interior surface 304 of the distal cathode body 110*b*. Upon engagement, a proximal portion of the electrode 104 is disposed within the hollow distal cathode body 110*b*. This fixed attachment can be achieved via a threaded connection, where at least one thread 306 on the exterior surface 302 of the electrode 104 is configured to rotatably engage at least one groove 308 on the interior surface 304 of the distal cathode body 110*b*. In addition, at least one sealing mechanism 310 can be disposed between the interior surface 304 of the distal cathode body 110*b* and the exterior surface 302 of the electrode 104 to provide a waterproof seal between these two components. In other embodiments, the electrode 104 and the distal cathode body 110*b* are fixedly engaged to each other via a different locking mechanism, such as via interference fit.

Figure 4:
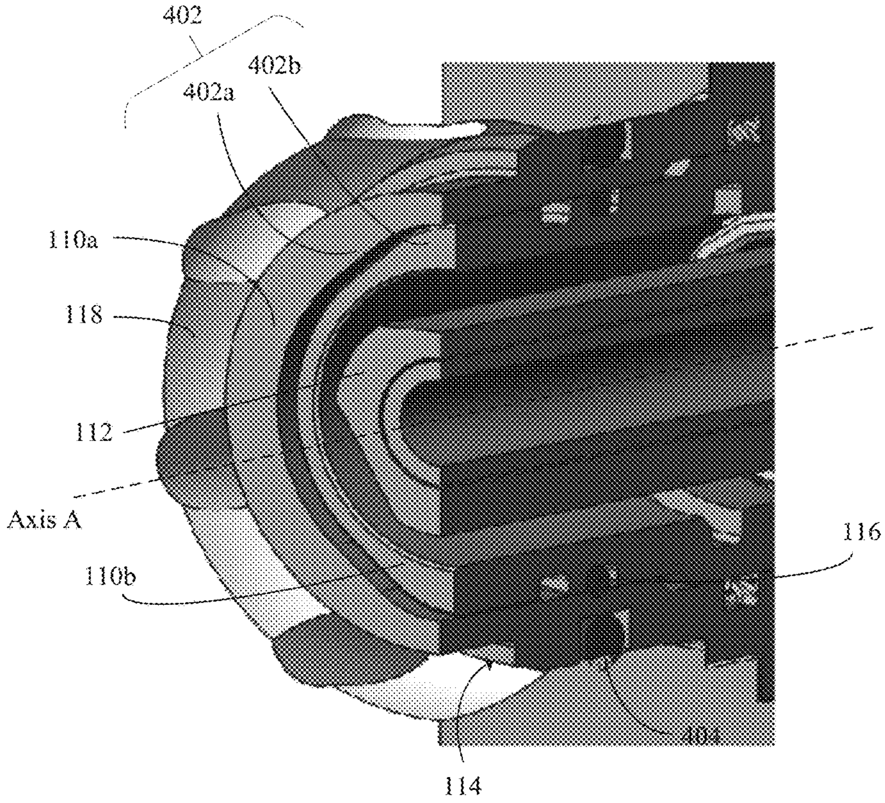
FIG. 4 shows a cross-sectional view of an exemplary connection between the proximal cathode body and the distal cathode body of the cathode of the plasma arc cutting torch of FIGS. 1 and 2, according to some embodiments of the present invention.

FIG. 4 shows a cross-sectional view of an exemplary connection between the proximal cathode body 110*a* and the distal cathode body 110*b* of the cathode 110 of the plasma arc cutting torch 100 of FIGS. 1 and 2, according to some embodiments of the present invention. As described above, the distal cathode body 110*b* is axially translatable relative to the proximal cathode body 110*a* along the longitudinal axis A. In some embodiments, the cathode 100 further includes a set of one or more anti-rotation features 402 located between the proximal cathode body 110*a* and the distal cathode body 110*b* to prevent a radial movement of these bodies relative to each other, while enabling their relative axial translation movement. As shown, the proximal cathode body 110*a* is substantially disposed in and fixedly engaged to the main channel 114 of the torch insulator 108 to ensure that the proximal cathode body 110*a* is substantially stationery. This fixed engagement between the main channel 114 of the torch insulator 108 and the proximal cathode body 110*a* can be achieved via an interference fit using, for example, an O-Ring 404 disposed between the two components. At least a proximal portion of the distal cathode body 110*b* is substantially disposed in the hollow body of the proximal cathode body 110*a* to form a telescoping arrangement, such that the distal cathode body 110*b* is axially translatable within the hollow body of the stationary proximal cathode body 110*a*. The set of one or more anti-rotation features 402 can include a set of one or more male shoulder sections 402*b* of the distal cathode body 110*b* and a set of one or more female shoulder sections 402*a* of the proximal cathode body 110*a*. Each male shoulder section 402*b* comprises a radial protrusion from an exterior surface of the distal cathode body 110*b*, and each female shoulder section 402*a* comprises a radial protrusion from an interior surface of the proximal cathode body 110*a*. Upon engagement, each male shoulder section 402*b* of the distal cathode body 110*b* is radially locked into place by at least one corresponding female shoulder section 402*a*, such as sandwiched between a pair of the female shoulder sections 402*a*, to prevent the distal cathode body 110*b* from radially rotating within the proximal cathode body 110*a*, but without hampering the axial movement of the proximal cathode body 110*a*. In some embodiments, a proximal portion of the coolant tube 112 is disposed in the hollow body of the distal cathode body 110*b*.

In some embodiments, the dynamic electrical contact 116 is disposed between the proximal body 110*a* and the distal body 110*b* of the cathode 110. The electrical contact 116 can be in the form of a ring-shaped, canted coil spring located between an exterior circumferential surface of the distal cathode body 110*b* and an interior circumferential surface of the proximal cathode body 110*a*. In some embodiments, the dynamic electrical contact 116 is configured to pass substantially all of a pilot arc current between the proximal and distal cathode bodies during a pilot arc mode of torch operation, as will be described below in detail.

Figure 5:
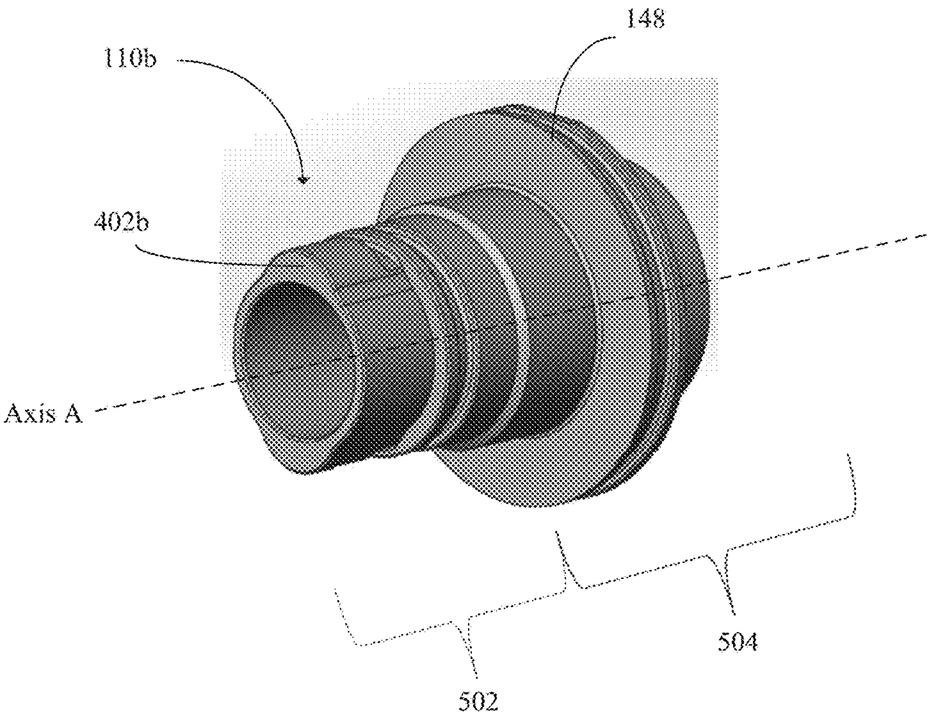
FIG. 5 shows a detailed perspective view of the distal body of the cathode of the plasma arc cutting torch of FIGS. 1 and 2, according to some embodiments of the present invention.

FIG. 5 shows a detailed perspective view of the distal body 110*b* of the cathode of the plasma arc cutting torch 100 of FIGS. 1 and 2, according to some embodiments of the present invention. As shown, the distal cathode body 110*b* generally comprises a proximal portion 502 and a distal portion 504. The proximal portion 502 of the distal cathode body 110*b* includes one or more protruding male shoulder sections 402*b* as described above with respect to FIG. 4 (e.g., two male shoulder sections 402*b* are illustrated in FIG. 5). These male shoulder sections 402*b* are adapted to engage the female shoulder sections 402*a* of the proximal cathode body 110*a* to prevent a radial movement between the cathode bodies while enabling their relative axial translation. The distal portion 504 includes the blowback flange 148 protruding from an exterior surface of the distal cathode body 110*b*. As described above, the blowback flange 148 defines at least a portion of the pressurization chamber 146 used to actuate the axial movement of the distal cathode body 110*b*. Specifically, the blowback flange 148 includes the lateral blowback surface 148*a* (shown in FIGS. 1 and 2) that is substantially orthogonal to the longitudinal axis A, where the lateral blowback surface 148*a* is exposed to a blowback pressure of the biasing fluid in the pressurization chamber 146 during the axial translation of the distal cathode body 110*b*. In some embodiments, an interior surface of the distal portion 504 of the distal cathode body 110*b* is configured to fixedly engage the electrode 104, as described above in detail with reference to FIG. 3. In some embodiments, an exterior surface of the proximal portion 502 of the distal cathode body 110*b* is slidably engaged to the proximal cathode body 110*a*, such that the distal cathode body 110*b* can slide distally relative to the proximal cathode body 110*a* until the blowback flange 148 physically abuts the proximal cathode body 110*a* to hinder further movement in the distal direction.

Figure 6:
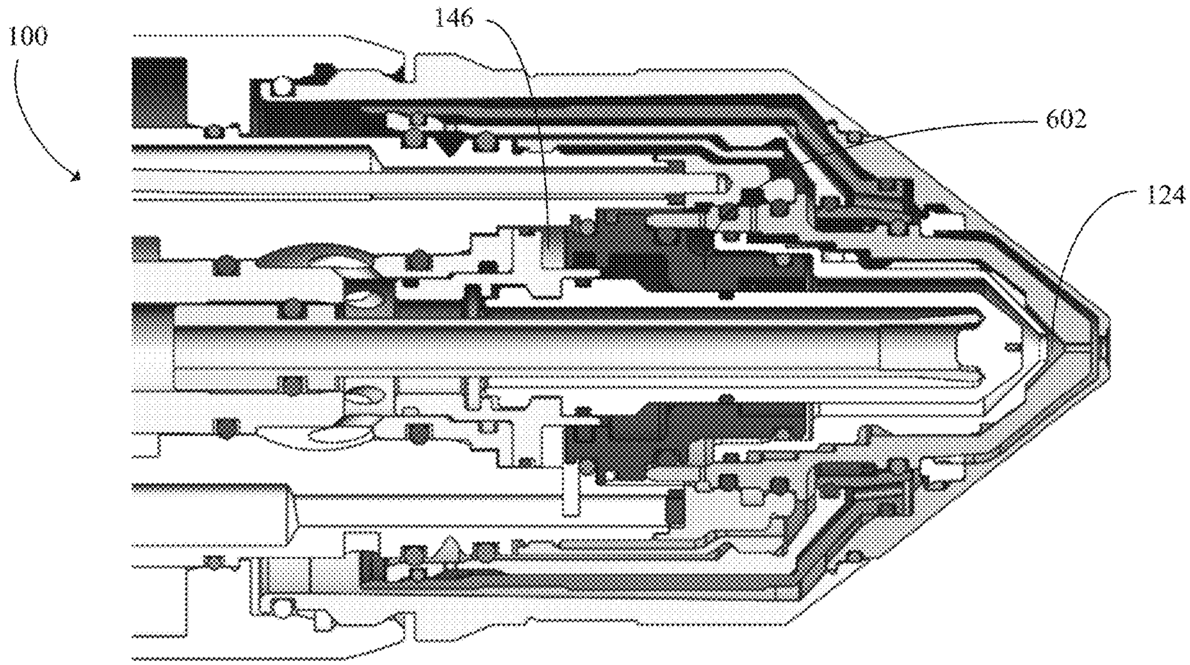
FIG. 6 shows another configuration of the pressurization chamber of the plasma arc cutting torch of FIGS. 1 and 2, according to some embodiments of the present invention.

FIG. 6 shows another configuration of the pressurization chamber 146 of the plasma arc cutting torch 100 of FIGS. 1 and 2, according to some embodiments of the present invention. As shown, instead of the swirl ring 135 and the chamber cover 138 being two separate components that are fixedly attached to each other (as shown in FIGS. 1 and 2), these two components can be combined to form a unitary structure 602, where the chamber cover 138 is a part of the swirl ring 135, and the structure 602 is constructed from a single insulating material. Thus, in FIG. 6, the distal portion of the pressurization chamber 146 is defined by the proximal end of the unitary swirl ring 602. In addition, the unitary swirl ring 602 provides the dual function of gas swirling and fluid-tight sealing of the plenum region 124.

Figure 7:
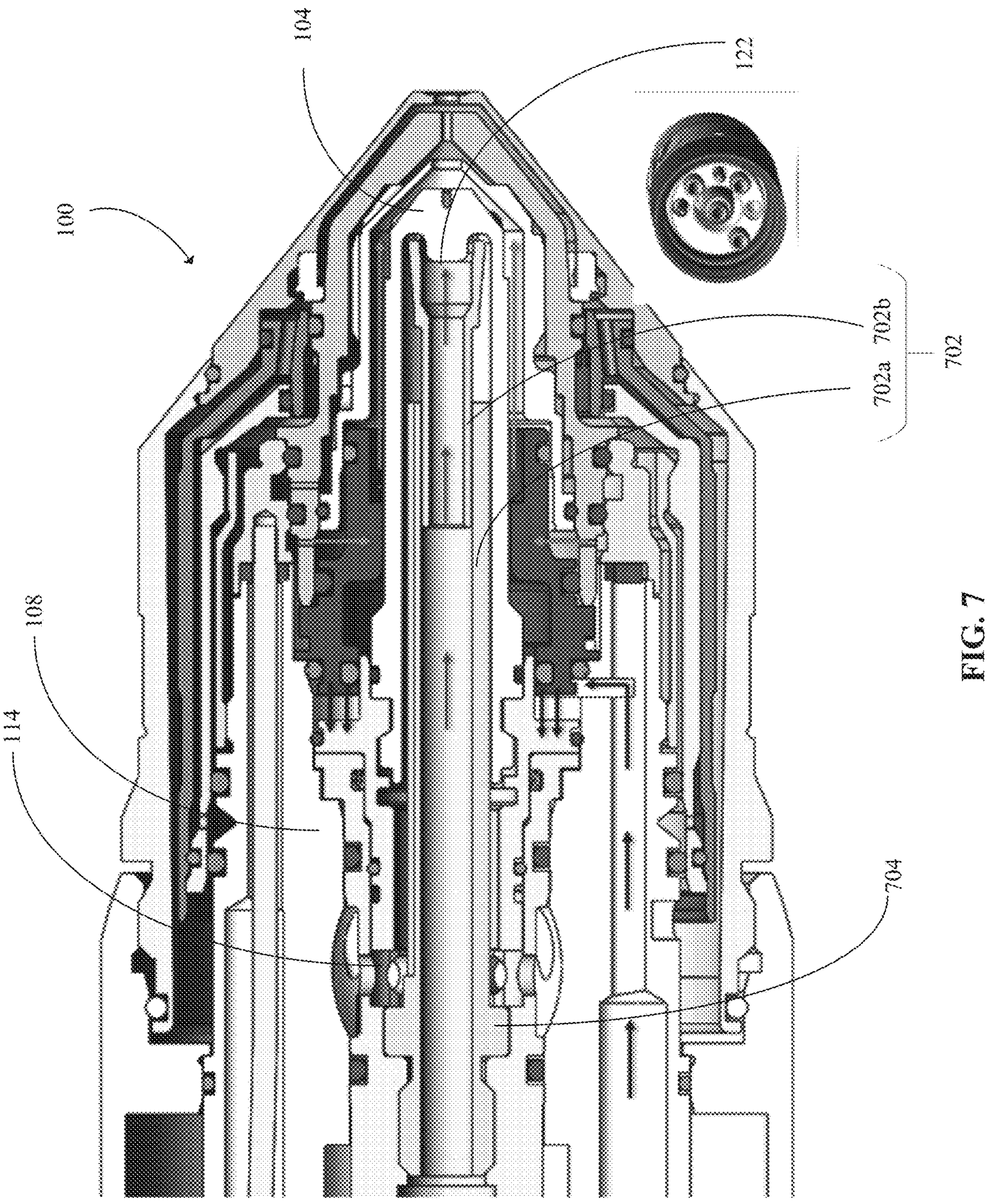
FIG. 7 shows another configuration of the coolant tube of the plasma arc cutting torch of FIGS. 1 and 2, according to some embodiments of the present invention.

FIG. 7 shows another configuration of the coolant tube 112 of the plasma arc cutting torch 100 of FIGS. 1 and 2, according to some embodiments of the present invention. As shown, another multi-piece telescoping coolant tube 702 can be used in the plasma arc cutting torch 100, in place of the coolant tube 112. The coolant tube 702 comprises at least two pieces, a proximal piece 702*a* and a distal piece 702*b*. The distal coolant tube piece 702*b* is adapted to translate axially within the hollow boy of the proximal piece 702*a* in a telescoping fashion, while the proximal piece 702*a* is fixedly engaged to the torch insulator 108. For example, the proximal piece 702*a* of the coolant tube 702 can be fixedly engaged to the main channel 114 of the torch insulator 108 via a threaded connection comprising one or more threads 704 disposed on an exterior surface of the proximal piece 702*a* of the coolant tube 702. In some embodiments, the coolant tube 702 is similar to the coolant tube 112, except the distal piece 702*b* of the coolant tube 702 is shorter in length and not as constrained such that it is flared within the fixed proximal piece 702*a*. In operation, when a liquid coolant is conducted to flow distally within the coolant tube 702, the pressure exerted by the liquid coolant flow actuates the distal coolant tube piece 702*b* to move distally, thereby extending the overall length of the coolant tube 702. As the coolant exits from the coolant tube 702 and impinges on the distal internal coolant surface 122 of the electrode 104, the coolant is adapted to bias the electrode 104 forward in the distal direction. The extension/telescoping movement of the distal coolant tube piece 702*b* ensures suitable axial spacing between the tip of the coolant tube 702 and the electrode 104 is maintained across the wide range of electrode biasing motions. Further, because the electrode 104 is adapted to slide on the proximal coolant piece 702*a* during operation, the close tolerance of the proximal coolant piece 702*a* acts as a guide post for the electrode 104, with a layer of coolant between the inner diameter of the electrode 104 and the outer diameter of the proximal coolant piece 702*a*.

Figure 8:
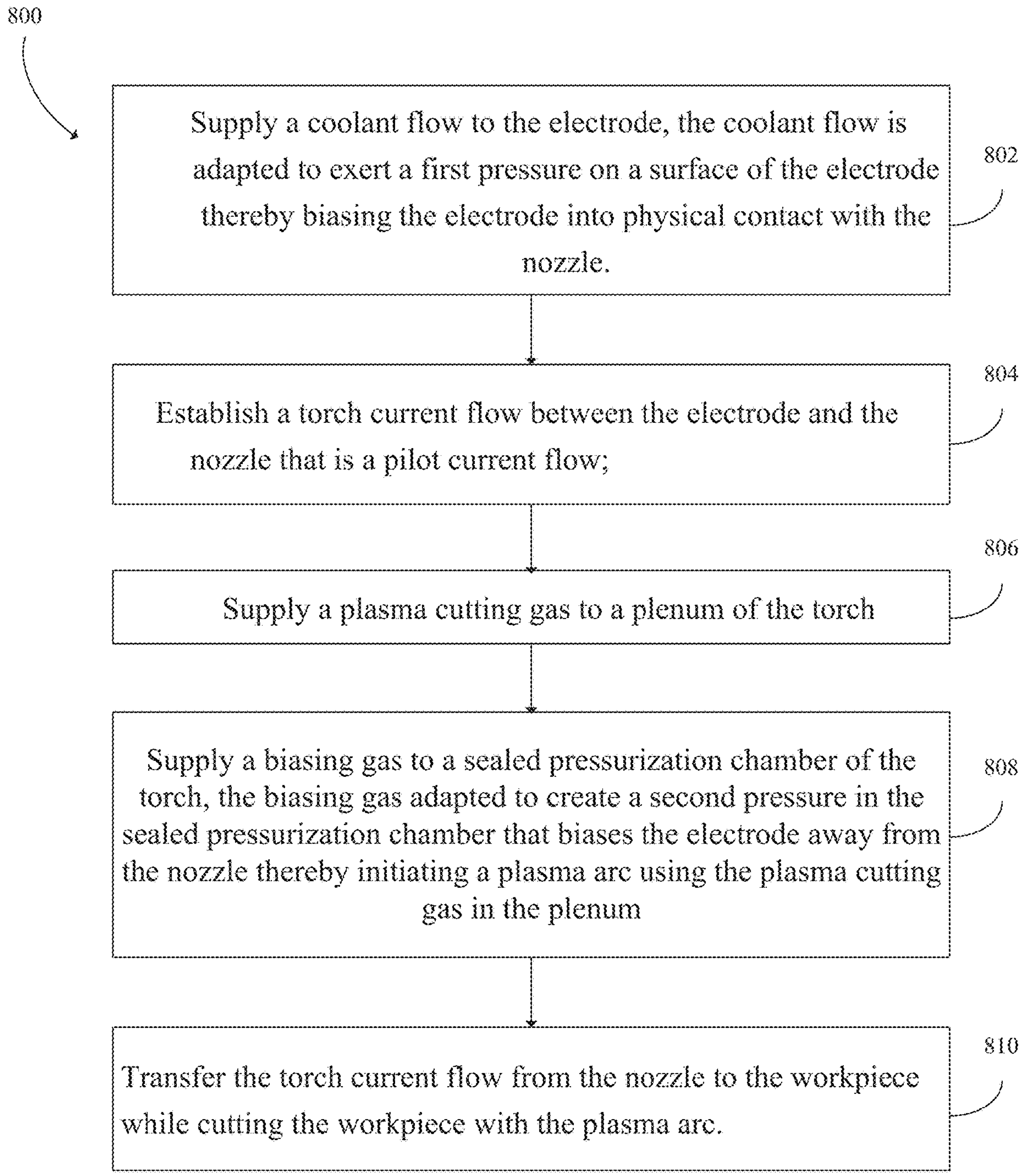
FIG. 8 shows an exemplary method for contact starting the plasma arc cutting torch of FIGS. 1 and 2, according to some embodiments of the present invention.

In general, the plasma arc cutting torch 100 of FIGS. 1 and 2 enables axial translation of the electrode 104 within the torch 100 for the purpose of contact starting the torch 100 independent of the plasma gas flow 150 used for plasma arc initiation. FIG. 8 shows an exemplary method 800 for contact starting the plasma arc cutting torch 100 of FIGS. 1 and 2, according to some embodiments of the present invention. In operation, a coolant flow 140 is supplied to the coolant tube 112 inserted into the cavity 120 of the electrode 104 (step 802). Upon entry in to the electrode 104, the coolant flow 140 is adapted to flow distally in a distal direction within the coolant tube 112. As the coolant flow 140 exits from the coolant tube 112 within the cavity 120, the coolant flow 140 exerts a forwarding biasing pressure on the distal internal coolant surface 122 of the electrode 104. In some embodiments, in a pilot arc mode of torch operation, the electrode 104 is biased toward and makes physical contact with the nozzle 106 (as shown in FIG. 1) when the forward biasing force is greater than any counter blowback force within the torch 100, such as greater than a blowback force created in the pressurization chamber 146 by the biasing fluid flow 142. Thus, to ensure that this physical contact occurs in the pilot arc mode, the biasing fluid flow 142 supplied to the pressurization chamber 146 is turned off or sufficiently ramped down such that the forward biasing force is greater on balance. This condition allows the torch 100 to be ready for the subsequent start.

To start a pilot arc in the pilot arc mode, a pilot arc current is coupled to a power line from a power supply (not shown) to the plasma arc torch 100, where a pilot current flow is established between the electrode 104 and the nozzle 106 due to their physical contact with each other (step 804). In an exemplary pilot current flow path, the pilot arc current flow can be passed from the power supply to the proximal body 110*a* of the cathode 110. In some embodiments, at least a portion of the pilot arc current is passed from the proximal cathode body 110*a* to the distal cathode body 110*b* via the dynamic electrical contact 116 therebetween. For example, the electrical contact 116 can be suitably configured to pass substantially all of the pilot arc current between the two cathode bodies 110*a*, 110*b*. In some other embodiments, all or substantially all of the pilot arc current passes directly between the two cathode bodies 110*a* and 110*b* themselves. The distal cathode body 110*b* can in turn pass the pilot arc current to the electrode 104 to which the distal cathode body 110*b* is physically connected. Due to the physical contact between the electrode 104 and the nozzle 106 (caused by the forward biasing force provided by the coolant flow 140), the pilot arc current is adapted to flow to the nozzle 106. In some embodiments, because the electrical contact 116 is sandwiched between the two cathode bodies 110*a*, 110*b*, and both of which are liquid cooled by the coolant flow 140, this enables effective heat removal from the electrical contact 116, thereby allowing the electrical contact 116 to carry full process current (e.g., up to 300 Amps in case of a fault condition) without damaging torch components.

A pre-flow of the plasma gas flow 150 can be introduced into the plenum region 124 between the nozzle 106 and the electrode 104 before, during and/or after the pilot arc current in the plenum region 124 is established (step 806). In the prior art gas cooled systems, the pressure exerted by the plasma gas flow 150 is used to overcome the mechanical (e.g., spring based) based forward biasing force to move the electrode 104 proximally away from the nozzle 106, thereby creating an air gap between the two components. However, for the plasma arc torch 100, the biasing fluid flow 142 supplied to the sealed pressurization chamber 146 is turned on or ramped up to create a blowback force against the lateral surface 148*a* of the biasing flange 148 of the distal cathode body 110*b* (step 808). The blowback force is adapted to be greater than the forward biasing force of the coolant flow 140 on the electrode 104 in order to urge the distal cathode body 110*b* to axially translate in the distal direction until the biasing flange 148 is in physical contact with the proximal cathode body 110*a*, as illustrated in FIG. 2. The axial translation of the distal cathode body 110*b* also axially translates the electrode 104 proximally away from the nozzle 106 to create an air gap 107 in the plenum region 124. In some embodiments, the axial distance traveled by the distal cathode body 110*b* to contact the proximal cathode body 110*a* is configured to enable arc generation in the air gap 107 in the plenum region 124, thereby enabling the resulting cutting performance. In some embodiments, this translatable axial distance of the distal cathode body 110*b* relative to the proximal cathode body 110*a* is about the same as the axial length of the air gap 107 in the plenum region 124 within which arc generation occurs. In some embodiments, the maximum axial distance that is translatable by the distal cathode body 110*b* relative to the proximal cathode body 110*a* is between about 0.02 inches to about 0.09 inches, such as between about 0.0225 inches to about 0.08 inches or between about 0.025 inches to about 0.055 inches.

To generate a plasma arc, a potential difference develops between the electrode 104 and the nozzle 106 as the gap 107 between them increases. The pilot arc current ionizes the pre-flow of plasm gas flow 150 in the resulting gap 107 and initiates a pilot arc in that region. Thus, in the plasma arc torch 100, the biasing of the electrode 104 relative to the nozzle 106 (either into contact or away from each other) is independent of the plasma gas flow 150. For example, the electrode 104 can be actuated to bias away from the nozzle 106 after the plasma gas flow 150 is supplied to the plenum region and the appropriate plasma gas pressure is reached. In some embodiments, the lateral blowback surface 148*a* of the blowback flange 148 has a larger surface area than the distal internal coolant surface 122 of the electrode 104 such that the biasing fluid flow 142 is able to create a sufficiently large blowback force to overcome the forward biasing force to separate the electrode 104 from the nozzle 106, even though the pressure of the biasing fluid flow 142 is less than the pressure of the coolant flow 140. In general, the separation of the blowback pressure (created by the biasing fluid flow 142) from the plasma gas pressure (of the plasma gas flow 150) results in better cut quality by the plasma arc torch 100 at least because the plasma gas flow 150 no longer needs to establish a sufficiently high pressure to bias the electrode 104 away from the nozzle 106; thus a lower plasma gas pressure can be used that provides better control over torch operations. In addition, depleting plasma gas pressures during ramp down and/or supplying different plasma pressures for different processes no longer negatively impact electrode movement in the plasma arc torch 100 (in contrast to prior art torches), thus improving consumable life and quality. Further, as described above, a pre-flow of the plasma gas can be supplied to the plenum region 124 prior to and/or during physical contact between the electrode 104 and the nozzle 106, thereby establishing sufficient pressure in the plenum region 124 that drives rapid arc transfer immediately/shortly after physical contact breaks between the electrode 104 and the nozzle 106, without having to wait for optimal transfer conditions to be established.

In a transferred arc mode of torch operation for cutting a workpiece, the workpiece is grounded and brought close to the distal end of the torch 100. A voltage higher than the voltage used to initiate the pilot arc can be applied across the electrode 104 and the workpiece to induce the arc to transfer to the workpiece after the gap is ionized. This arc between the electrode 104 and the workpiece is a transferred arc that can be used to cut the workpiece (step 810). To maintain the transferred arc, a transferred arc current, which supplies the higher voltage from the power supply, is passed from the proximal cathode body 110*a* to the distal cathode body 110*b* to the electrode 104. In some embodiments, the electric contact 116 passes at least a portion of the transferred arc current. Another portion of the transferred arc current can be passed via the physical contact/interface between the proximal and distal cathode bodies 110*a*, 110*b*. To complete the transferred arc circuit, the transferred arc current is returned from the workpiece to the power supply through separate wirings (not shown).

In some embodiments, because torch cooling is needed during both pilot arc initiation and plasma cutting by transferred arc, the coolant flow 140 is supplied during both modes of operation. In some embodiments, the coolant flow 140 is supplied into the torch 100 with a relatively constant pressure during both modes of torch operation. Thus a relatively constant forward biasing force can be present during both modes of torch operation. In contrast, prior art plasma arc torches and systems do not control the pressure of the coolant flow to ensure forward biasing of the electrode relative to the nozzle. In some embodiments, the pressure supplied by the biasing fluid flow 142 is suitably modulated to either (i) ramp up or be turned on to create a blowback force greater than the forward biasing force to bias the electrode 104 away from the nozzle 106 or (ii) ramp down or be turned off such that the forward biasing force dominates, thereby biasing the electrode 104 into the nozzle 106.

Figure 9:
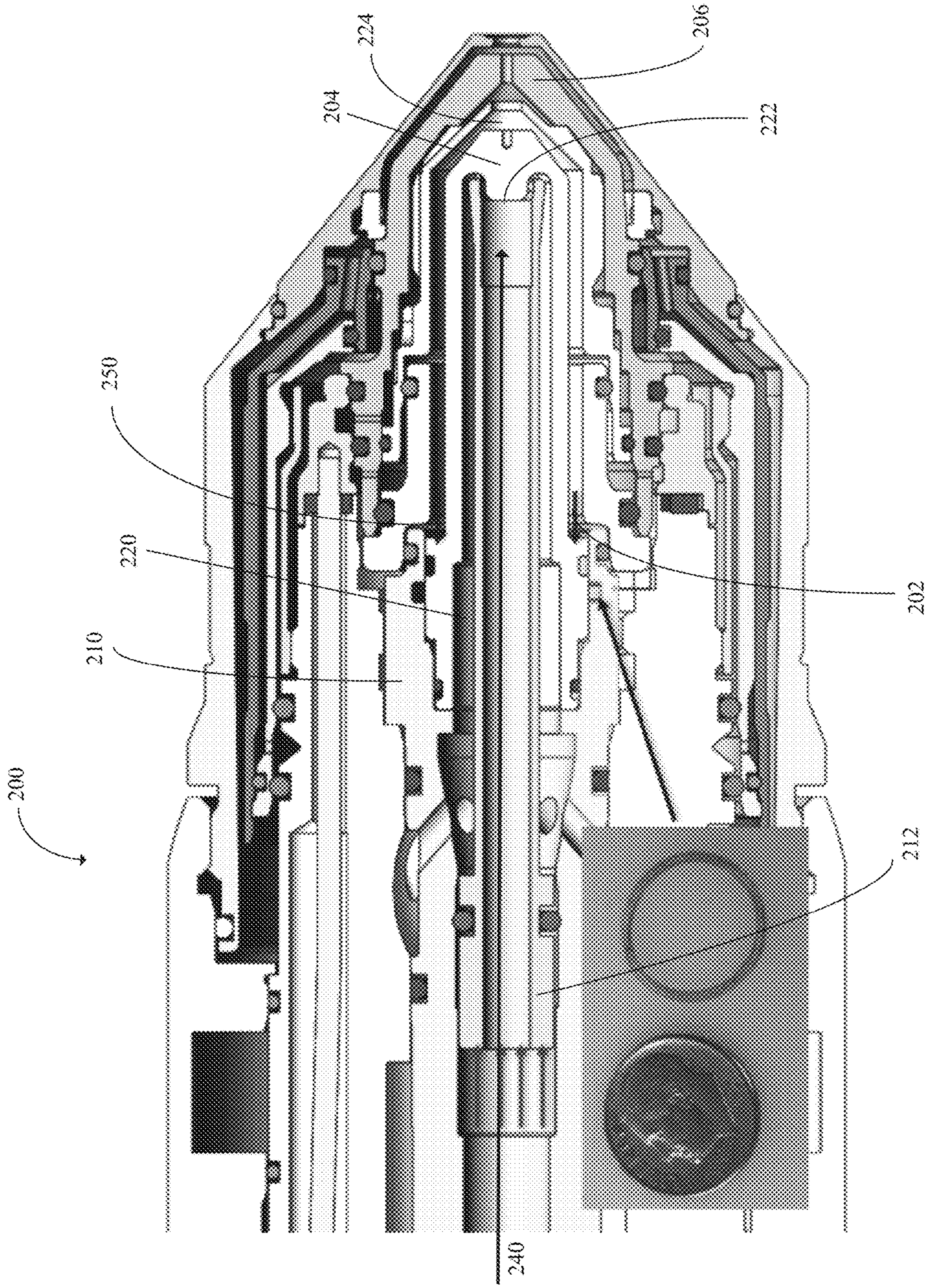
FIG. 9 shows another exemplary plasma arc cutting torch, according to some embodiments of the present invention.

FIG. 9 shows another exemplary plasma arc cutting torch 200, according to some embodiments of the present invention. In this torch 200, a plasma gas flow 250 is used for both plasma arc initiation and electrode biasing. As shown, the torch 200 includes a monolithic cathode 210, a coolant tube 212, an electrode 204 and a nozzle 206. Similar to the torch 100 of FIGS. 1 and 2, the coolant tube 212 is configured to introduce a coolant flow 240 to an internal cavity 220 of the electrode 204 to both cool the electrode 204 and apply a forward biasing force on the distal internal coolant surface 222 that is adapted to bias the electrode 204 into contact with the nozzle 206. During pilot arc initiation, a flow of the plasma gas 250 is introduced to a plenum region 224 of the torch 200, where the plasma gas flow 250 serves the dual function of generating the plasma arc and exerting a blowback force on an end surface 202 of the electrode 204 to bias the electrode 204 distally away from the nozzle 206. In some embodiments, no other blowback force is present in the torch 200. In some embodiments, to separate the electrode 204 from the nozzle 206, the blowback force provided by the plasma gas flow 250 is greater than the forward biasing force associated with the liquid coolant flow 240. For example, the biasing forward pressure exerted by the coolant flow 240 can be relative low, such as about 60 PSI to about 80 PSI, and the pressure of the plasma gas flow 250 is high enough to overcome the relatively low coolant pressure to separate the electrode 204 from the nozzle 206. In some embodiments, to ensure that the electrode 204 maintains physical contact with the nozzle 206 in the pilot arc mode, the blowback force provided by of the plasma gas flow 250 is lower than the forward biasing force of the coolant flow 240. For example, the pressure of the plasma gas flow 250 can be modulated to be lower than the pressure of the coolant flow 240. Thus, in comparison to the torch 100 of FIGS. 1 and 2, a limitation of the torch 200 is that the relative motion of the electrode 202 is dependent on the pressure of the plasma gas flow 250, and such selective modulation of the pressure of the plasma gas flow 250 may in turn affect the quality of plasma arc initiation. For example, the need to supply the plasma gas flow 150 at a sufficiently high pressure to overcome the forwarding biasing pressure of the coolant flow 240 to separate the electrode 204 from the nozzle 206 can be damaging to the resulting plasma arc formation, thus harmful to overall cutting quality. The plasma arc torch 200 of FIG. 9 can be susceptible to process variations and thus may limit the range of process parameters that can be used. Additionally, the plasma arc torch 200 has a relatively small surface area (e.g., at the distal end face of the electrode 204) for plasma pressure to act on (and thus the blowback biasing force). This can constrain the maximum coolant pressure applied at torch inlet, thus limiting coolant velocity, heat removal capacity, and current capacity that the torch 200 can handle.

As described above, in both torch 100 of FIGS. 1 and 2 and torch 200 of FIG. 9, the liquid coolant flow is configured to bias the electrode toward the nozzle to enable physical contact between the two consumables. Specifically, the forward biasing force of the coolant flow is greater than any counter blowback force within the torch in order to create a non-equilibrium condition for achieving this physical contact. To bias the electrode 104 proximally away from the nozzle 106, a counter blowback force is generated and/or increased within the torch. The counter blowback force is greater than (i.e. overcomes) the forward biasing force of the coolant flow within the torch in order to creates another non-equilibrium condition for separating the electrode from the nozzle. In some embodiments, as shown in FIG. 2, the greater counter blowback force is achieved by the biasing fluid flow 142 supplied to the sealed pressurization chamber 146 (substantially independent of any contribution from the plasma gas flow 150). In some embodiments, as shown in FIG. 9, the greater counter blowback force is achieved by the plasma gas flow 150 (substantially without any secondary contributions). In some embodiments, the greater counter blowback force is achieved by a combination of blowback forces exerted by the biasing fluid flow 142 and by the plasma gas flow 150. For example, about 40% of the total blowback force can be from the plasma gas flow and about 60% of the total blowback force can be from the secondary biasing fluid flow 142 (or any other reasonable combination of forces from the two different fluid flows). The plasma gas flow 150 and the biasing fluid flow 142 can be controllably modulated to achieve the desired combination. In some embodiments, a pressure of the fluid flow(s) supplied to achieve the greater counter blowback force is lower than a pressure of the coolant flow used to generate the forward biasing force. This is because the contact surface(s) on which the blowback forces exerts have an overall surface area that is larger than the surface area of the contact surface (e.g., the internal coolant surface 122 of the electrode 104) on which the biasing forward force exerts.

Figure 10:
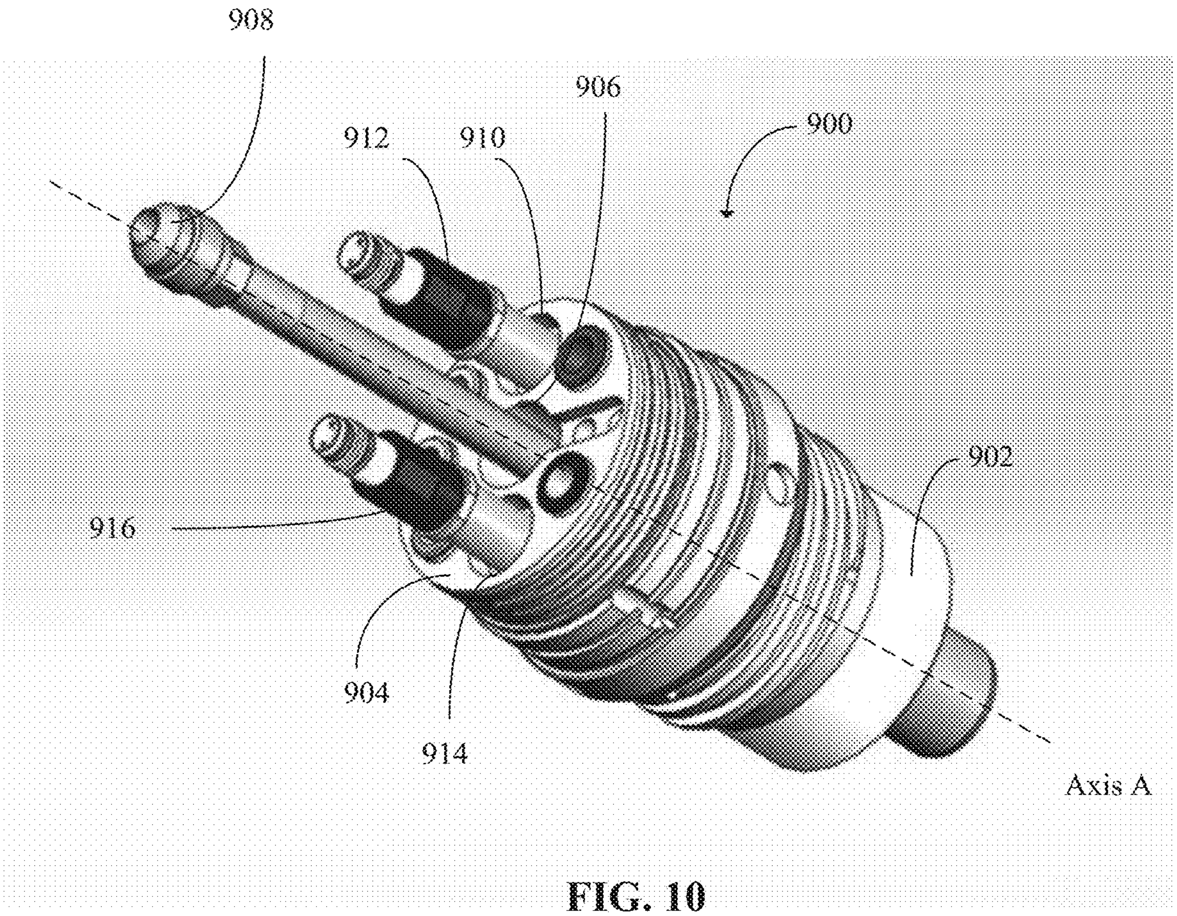
FIG. 10 shows an exemplary receptacle configured for connection with the plasma arc cutting torch of FIGS. 1 and 2, according to some embodiments of the present invention.

FIG. 10 shows an exemplary receptacle 900 configured for connection with the plasma arc cutting torch 100 of FIGS. 1 and 2, according to some embodiments of the present invention. Specifically, the receptacle 900 is configured for connection with the proximal end of the torch body 102 of the torch 100 and is positioned upstream from the torch 100 to controllably deliver various gases, liquids and/or electrical supplies to the torch 100. As shown, the receptacle 900 generally defines a substantially cylindrical body 902 extending along the central longitudinal axis A and includes a proximal end face 904 and a distal end face (not shown). A central channel 906 is disposed in the receptacle body 902, where the central channel 906 extends along the length of the receptacle body 902. The central channel 906 can be substantially symmetrical about the central longitudinal axis A. The central channel 906 is configured to receive at least a portion of a tubular coolant valve interface/receptacle 908 that is adapted to interface with a coolant valve (not shown) to deliver a supply of liquid coolant to the coolant tube 112 of the torch 100 upon engagement between the receptacle 900 and the torch body 102. In some embodiments, the coolant valve interface/receptacle 908 is electrical conductive (e.g., constructed from brass and/or copper) to supply a current to the torch 100. The coolant valve to which the coolant valve interface/receptacle 908 is connected can be located upstream from the receptacle 900 or integrated with the receptacle body 902. As described above, the liquid coolant supplied by the coolant valve interface/receptacle 908 performs the dual function of torch cooling and forward biasing of the electrode 104 toward the nozzle 106.

In some embodiments, the receptacle 902 includes a gas channel 910 disposed in the receptacle body 902, where the gas channel 910 extends along the length of the receptacle body 902. The gas channel 910 can be located radially offset from and non-concentric relative to the central longitudinal axis A. The gas channel 910 is configured to receive at least a portion of a plasma gas valve 912 adapted to regulate and deliver the plasma cutting gas flow 150 to the plenum region 124 of the torch 100. In some embodiments, the receptacle 902 includes a fluid channel 914 disposed in the receptacle body 902, where the fluid channel 914 extends along the length of the receptacle body 902. The fluid channel 914 can be radially offset from and non-concentric relative to the central longitudinal axis A. In some embodiments, the fluid channel 914 is configured to receive at least a portion of a biasing fluid valve 916 adapted to regulate and deliver a supply of the biasing fluid (e.g., gas) flow 142 to the pressurization chamber 146 of the torch 100. The biasing fluid valve 916 can controllably adjust the pressure of the biasing fluid flow 142, such as increase (or turn on) the fluid pressure to create a blowback force against a blowback flange 148 of the pressurization chamber 146 to bias the electrode 104 away from the nozzle 106 or decrease (or turn off) the fluid pressure to allow the forward biasing force of the coolant flow dominate (e.g., bias) the electrode 104 into contact with the nozzle 106. In some embodiments, the biasing fluid valve 916 is a three-way valve, as described below in detail with respect to FIG. 13.

Figure 11:
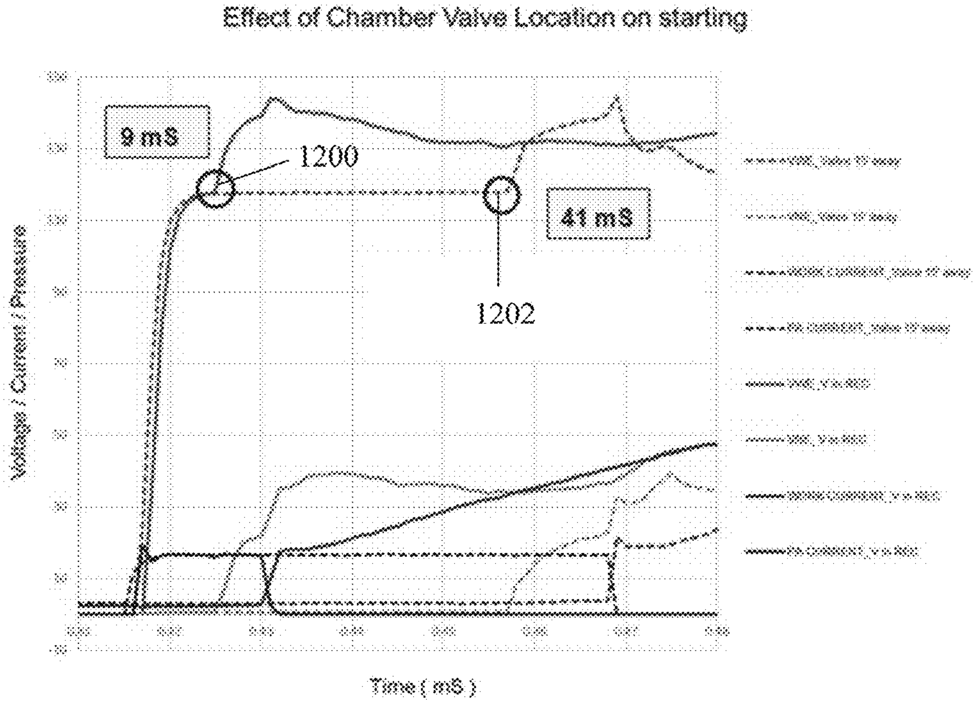
FIG. 11 shows a diagram illustrating the effectiveness of the receptacle of FIG. 10, according to some embodiments of the present invention.

One advantage of locating the biasing fluid valve 916 in the receptacle 900 adjacent to the torch 100 is that this enables faster actuation of the electrode 104 relative to the nozzle 106, which minimizes energy dissipation and/or heat buildup at the nozzle 106, thus positively impacting consumable life. FIG. 11 shows a diagram illustrating the effectiveness of the receptacle arrangement of FIG. 10, according to some embodiments of the present invention. This diagram illustrates exemplary times the plasma arc cutting torch 100 took to initiate movement of the electrode 104 away from the nozzle 106 within the plasma arc torch 100, which is dependent on the location of the biasing fluid valve 916. Specifically, these times are dependent on how close the biasing fluid valve 916 is located to the pressurization chamber 146. As shown, when a 4 mm gas hose is used to connect the biasing fluid valve 916 to the pressurization chamber 146, signal 1200 indicates that it took about 9 ms to start electrode movement when the biasing fluid valve 916 was placed in the receptacle body 902. In contrast, if the biasing fluid valve 916 was placed 15 feet away from the pressurization chamber 146 external to the receptacle body 902 (e.g., in a stand-alone cavity), signal 1202 indicates that it took about 41 ms to start electrode movement.

In some embodiments, the receptacle 900 is configured to support wireless communication with the plasma arc cutting torch 100, such as facilitate radio-frequency identification (RFID)-based communication with the torch 100. In such an RFID enabled system, an RFID tag can be disposed in the torch 100, while an RFID reader (not shown) can be disposed in the receptacle 900. The RFID tag can be configured to store data related to operating the torch 100, such as at least one of consumable identification information, consumable/torch usage history, process parameters, or operating data related to at least one of the liquid coolant flow, plasma cutting gas flow and/or biasing fluid flow.

Figure 12:
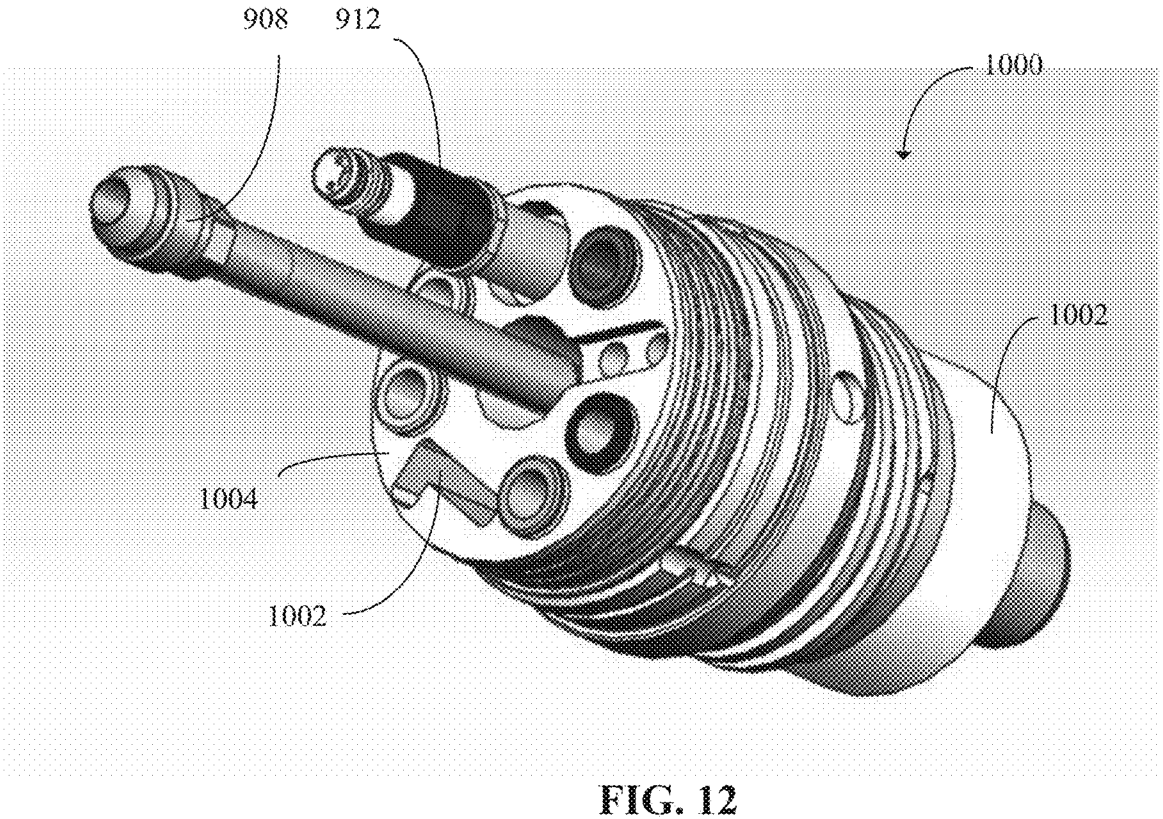
FIG. 12 shows another exemplary receptacle configured for connection with the plasma arc cutting torch of FIGS. 1 and 2, according to some embodiments of the present invention.

FIG. 12 shows another exemplary receptacle 1000 configured for connection with the plasma arc cutting torch 100 of FIGS. 1 and 2 while accommodating an RFID reader (not shown), according to some embodiments of the present invention. The receptacle 1000 of FIG. 12 is substantially similar to the receptacle 900 of FIG. 10, except the fluid channel 914 and the associated biasing fluid valve 916 of FIG. 10 that are used for actuation of the electrode 104 of the torch 100 are moved off of the receptacle 1000 to create space for the RFID reader. For example, the receptacle 1000 includes a cavity 1002 with an opening on the proximal end face 1004 of the receptacle body 1004. The cavity 1002 is configured to receive and house the RFID reader. In this configuration, the biasing fluid valve may be located further upstream from the plasma arc cutting torch 100 in comparison to the location of the biasing fluid valve 916 in FIG. 10. For example, the biasing fluid valve (e.g., valve 916) can be placed in a standalone cavity between the receptacle 1000 and an upstream torch console/off-valve manifold (not shown) or integrated with the upstream torch console/off-valve manifold. In some embodiments, the absence of any high frequency starting circuit in the torch system of FIGS. 1 and 2 allows sensitive RFID components to be disposed in the receptacle 1000 and/or the torch 100 while minimizing their exposure to electromagnetic interferences.

Figure 13:
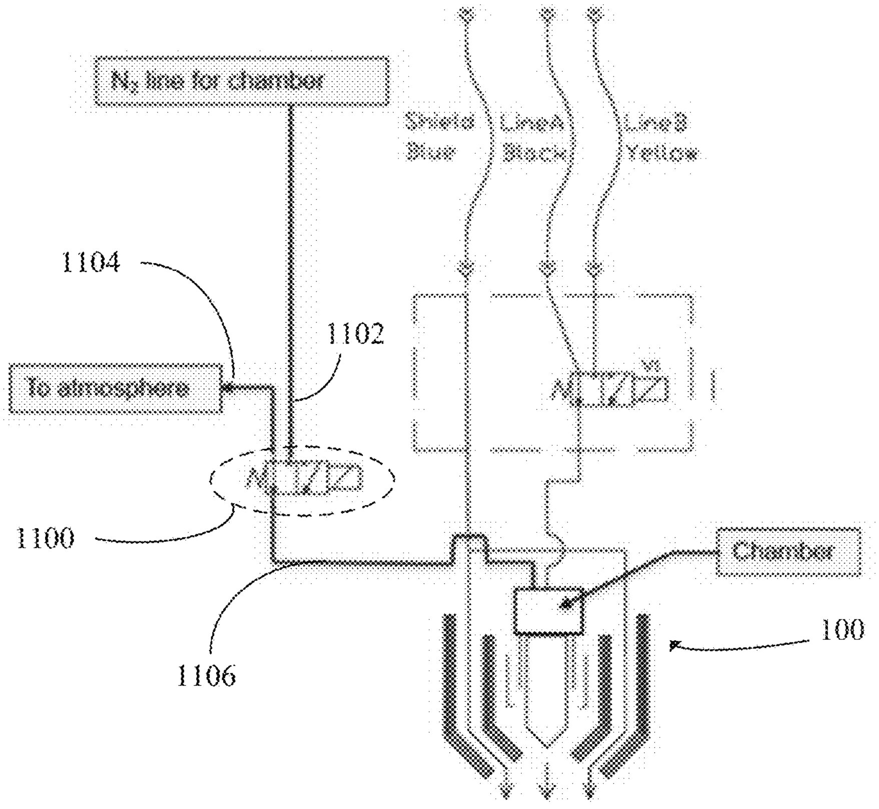
FIG. 13 shows an exemplary biasing fluid valve configured for connection with the plasma arc cutting torch of FIGS. 1 and 2, according to some embodiments of the present invention.

FIG. 13 shows an exemplary biasing fluid valve 1100 configured for connection with the plasma arc cutting torch 100 of FIGS. 1 and 2, according to some embodiments of the present invention. In some embodiments, the biasing fluid valve 1100 is substantially the same as the biasing fluid valve 916 of FIG. 10 that is disposed in the body 902 of the receptacle 900. In some embodiments, the biasing fluid valve 1100 is located external to the receptacle, such as in the arrangement shown in FIG. 12. The biasing fluid valve 1100 can be a three-way valve with an input gas port 1102 connected to a biasing gas source (not shown), such as a nitrogen gas source, a vent port 1104 to atmosphere, and an output gas port 1106 fluidly connected to the torch 100. The biasing fluid valve 1100, when energized, is configured to start supplying (or ramp up its supply of) a biasing gas from the input gas port 1102 to the pressurization chamber 146 inside of the torch 100 via the output gas port 1106. As explained above, the blowback force created by the biasing gas flow 142 inside of the pressurization chamber 146 is adapted to controllably bias the electrode 104 away from the nozzle 106. Continued energization of the biasing fluid valve 1100 maintains this separation. Once the biasing fluid valve 1100 is de-energized to turn off (or ramp down) the biasing gas supply, the valve 1100 drains all or a portion of the biasing gas trapped in the pressurization chamber 146 to atmosphere via the vent port 1104. This reduces or eliminates the blowback force in the torch 100, thereby allowing the coolant flow 140 to push the electrode 104 towards the nozzle 106.

Figure 14:
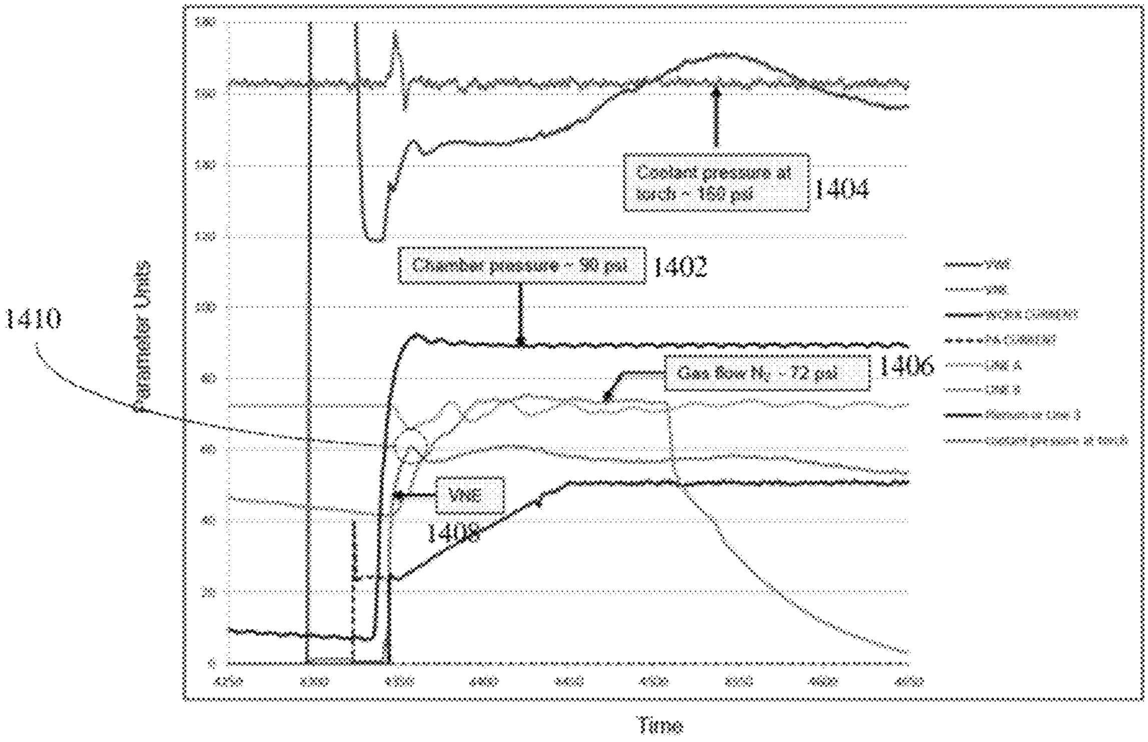
FIG. 14 shows a diagram illustrating exemplary pressure levels of various liquid flows and gas flows in the plasma arc cutting torch of FIGS. 1 and 2 during an operation of the torch, according to some embodiments of the present invention.

FIG. 14 shows a diagram illustrating exemplary pressure levels of various liquid flows and gas flows in the plasma arc cutting torch 100 of FIGS. 1 and 2 during an operation of the torch, according to some embodiments of the present invention. As explained above, the pressure 1402 of the biasing gas flow 142 can be relatively low (e.g., about 85 PSI to about 90 PSI) in comparison to the relatively high pressure 1404 of the coolant flow 140 (e.g., about 160 to 180 PSI). Thus, to overcome the forward biasing force of the coolant flow 140 during pilot arc initiation, the area of the contact surface (e.g., the lateral surface 148*a* of the blowback flange 148) that is exposed to the pressure of the biasing gas flow 142 is configured to be larger than the area of the contact surface (e.g., the internal coolant surface 122 of the electrode 104) that is exposed to the pressure of the coolant flow 140. Therefore, actuation of the electrode 104 is substantially independent of the pressure 1406 of the plasma gas flow 150 supplied to the torch 100, and the plasma gas flow 150 is only used for plasma arc initiation. In some embodiments, when electrode 104 and nozzle 106 are in physical contact with each other and the pilot arc current is flowing between them, there is no potential difference (voltage) between the two components. Thus, the subsequent increase in $V_{NE}$ voltage 1408 indicates the separation of the contact between nozzle and electrode and thus can be used as a surrogate signal for detecting the separation. Specifically, when the nozzle 106 and the electrode 104 are in contact, there is minimal (e.g., no) potential difference between them. As these components separate from each other, a potential difference grows, as reflected in the VNE signal 1408. Therefore the infliction 1410 in the VNE voltage 1408 in the early part of the cutting process can be used as a surrogate signal for detecting electrode separation movement.

Figure 15:
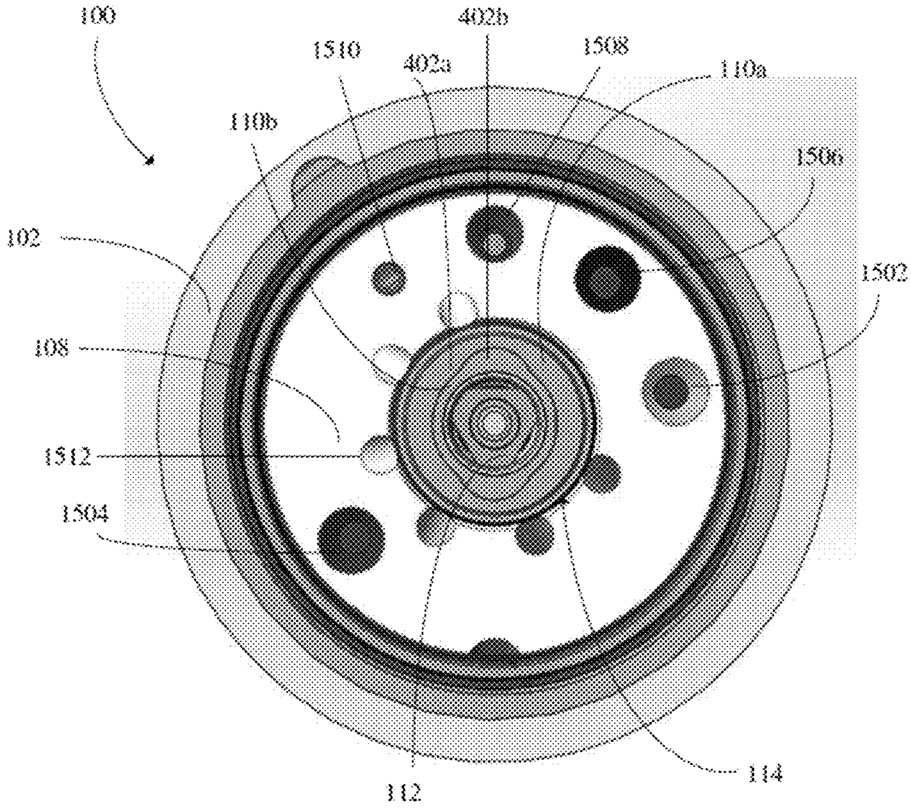
FIG. 15 shows a sectional view of the plasma arc cutting torch of FIGS. 1 and 2, according to some embodiments of the present invention.

FIG. 15 shows a sectional view of the plasma arc cutting torch 100 of FIGS. 1 and 2, according to some embodiments of the present invention. As shown, the torch insulator 108 of the torch 100 is substantially disposed in and surrounded by the torch body 102 about the central longitudinal axis A. The insulator 108 includes the main central channel 114 in which the proximal cathode body 110*a* is disposed and fixedly connected to. The proximal cathode body 110*a* substantially surrounds at least a portion of the distal cathode body 110*b*, where the two cathode bodies 110*a*, 110*b* are connected such that they do not radially rotate relative to each other, but the distal cathode body 110*b* is configured to axially translate relative to the proximal cathode body 110*b*. This connection is enabled by the anti-rotation features 402*a, b* (e.g., shoulder sections) disposed on both the proximal and distal cathode bodies 110*a, b*, as described above in detail with reference to FIG. 4. As shown, the coolant tube 112 is substantially surrounded by the cathode bodies 110*a*, 110*b* about the central longitudinal axis A. As described above with reference to FIG. 10, the coolant valve interface/receptacle 908 of the receptacle 900 can align with the coolant tube 112 upon engagement between the receptacle 900 and the torch 100 to deliver a flow of liquid coolant to the torch 100. In some embodiments, the torch body 102, insulator 108, cathode bodies 110*a*, 110*b* and coolant tube 112 are substantially concentrically disposed about the central longitudinal axis A.

In addition, the insulator 108 includes several non-concentric channels that are offset from the central longitudinal axis A for conducting various liquids and/or gases to the consumables attached thereto. For example, the insulator 108 includes a plasma gas channel 1504 extending along the longitudinal axis A for receiving a plasma gas flow (e.g., the plasma gas flow 150 of FIG. 1) from the plasma gas valve 912 of the receptacle 900 (shown in FIG. 10) and delivering the plasma gas flow to the plenum region 124 between the electrode 104 and the nozzle 106. The insulator 108 can also include a biasing fluid channel 1502 extending along the longitudinal axis A for conducting a biasing fluid flow (e.g., the biasing gas flow 142 of FIG. 2) to the pressurization chamber 146 adjacent to the distal cathode body 110*b*. In some embodiments, the biasing fluid flow is received from the biasing fluid valve 916 of the receptacle 900 (shown in FIG. 10). In some embodiments, the biasing fluid flow is received from a source external to the receptacle 900. The insulator 108 can further include a shield fluid channel 1506 for supplying a shield fluid (e.g., gas) to the torch 100, a pilot pin 1508, and a vent tube and ohmic pin 1510. In some embodiments, the insulator 108 includes multiple internal coolant passages 1512 from the electrode 104 to the nozzle 106 as well as a coolant return passage 1512 to the torch leads.

As described above, systems and methods of the present invention can utilize two fluid flows to actuate torch components, such as a liquid coolant flow to enable contact between the nozzle and the electrode and a biasing gas flow from a separate chamber to break this contact. An advantage of using fluids for component actuation is that they offer reliable and consistent motive force, which is free from common spring problems such as stiffness variability, aging, fatigue, wear, cracking and distortion. Another advantage is that these fluids enable component actuation independent of process gas (e.g., plasma cutting gas) type and pressure. This allows greater freedom in terms of process design, such as gas types, pressure set points, ramp up and/or down curves etc. Yet another advantage is that the electrode movement can be initiated after desired fluid flows and pressures are established in the plenum region. For example, the electrode 104 can be actuated to bias away from the nozzle 106 after the plasma gas flow 150 is supplied to the plenum region and the appropriate plasma gas pressure is reached. Other advantages include elimination of the need for high frequency starting using a HVHF circuit, enhanced cooling of pilot current carrying elements that improves robustness and range, and extended consumable life and consistent cut quality.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A contact start liquid-cooled plasma arc cutting torch comprising:

a translatable liquid-cooled electrode comprising an electrode body defining a proximal end and a distal end along a longitudinal axis of the electrode body, the electrode body including a coolant cavity with a distal internal coolant surface disposed at the distal end of the electrode body, the coolant cavity configured to receive at least a portion of a coolant tube of the torch for directing a liquid coolant flow distally through the coolant tube within the coolant cavity and toward the distal internal coolant surface of the electrode, wherein the distal internal coolant surface is shaped to redirect the liquid coolant flow proximally over an exterior surface of the coolant tube within the coolant cavity;

a nozzle disposed about the distal end of the electrode body; and a multi-piece cathode disposed about the proximal end of the electrode body, the cathode including:

a first body shaped to matingly engage the electrode, and a second body shaped to matingly engage a body of the torch, wherein the first body slidingly engages the second body such that the first body and the electrode are axially translatable relative to the second body along the longitudinal axis; and a gas input port for receiving and supplying a biasing gas to the torch, wherein the biasing gas is adapted to create a blowback pressure on the first body of the cathode to axially translate the first body into an abutting position with the second body, thereby axially translating the electrode away from the nozzle.

2. The contact start liquid-cooled plasma arc cutting torch of claim 1, wherein the axial translation of the electrode relative to the second body biases the electrode relative to the nozzle at the distal end of the electrode.

3. The contact start liquid-cooled plasma arc cutting torch of claim 1, wherein the liquid coolant flow in the coolant cavity of the electrode body is adapted to create a forward biasing pressure on the electrode to axially translate the electrode toward the nozzle, thereby axially translating the first body away from the second body of the cathode.

4. The contact start liquid-cooled plasma arc cutting torch of claim 3, wherein the forward biasing pressure is greater than the blowback pressure.

5. The contact start liquid-cooled plasma arc cutting torch of claim 4, wherein a lateral surface of the first body directly exposed to the blow-back pressure has a surface area that is greater than a surface area of the internal coolant surface of the electrode directly exposed to the forward biasing pressure, the lateral surface of the first body and the internal coolant surface of the electrode being orthogonal to the longitudinal axis.

6. The contact start liquid-cooled plasma arc cutting torch of claim 1, further comprising a sealed pressurization chamber having a first portion defined by a blowback flange of the first body of the cathode.

7. The contact start liquid-cooled plasma arc cutting torch of claim 6, wherein the blowback flange includes a first surface exposed to a biasing gas flow for urging the first body into an abutting position relative to the second body.

8. The contact start liquid-cooled plasma arc cutting torch of claim 7, wherein the sealed pressurization chamber is pressurized by the biasing gas received from a gas port disposed in the torch.

9. The contact start liquid-cooled plasma arc cutting torch of claim 7, wherein a pressure of the liquid coolant flow against the distal internal coolant surface of the electrode is greater than a pressure of the biasing gas flow.

10. The contact start liquid-cooled plasma arc cutting torch of claim 9, wherein the pressure of the liquid coolant flow is about 40% great that the pressure of the biasing gas flow.

11. The contact start liquid-cooled plasma arc cutting torch of claim 7, wherein a surface area of the first surf ace of the blowback flange is greater than a surface area of the distal internal coolant surface.

12. The contact start liquid-cooled plasma arc cutting torch of claim 6, wherein the sealed pressurization chamber has a second portion defined by one of a swirl ring or a plasma chamber cover.

13. The contact start liquid-cooled plasma arc cutting torch of claim 12, wherein the plasma chamber cover and the swirl ring form a unitary structure.

14. The contact start liquid-cooled plasma arc cutting torch of claim 1, wherein the axial translation of the electrode is independent of a plasma gas flow through the torch.

15. The contact start liquid-cooled plasma arc cutting torch of claim 1, wherein the cathode includes a set of one or more anti-rotation features located between the first and second bodies to prevent a radial movement of the first and second bodies relative to each other.

16. The contact start liquid-cooled plasma arc cutting torch of claim 15, wherein the set of one or more anti-rotation features comprises a set of one or more male shoulder sections of the first body and a set of one or more female shoulder sections of the second body, the male shoulder sections are configured to matingly engage the corresponding female shoulder sections.

17. The contact start liquid-cooled plasma arc cutting torch of claim 1, wherein the first body of the cathode includes a set of one or more threads to matingly engage the electrode.

18. The contact start liquid-cooled plasma arc cutting torch of claim 1, further comprising an electrical contact disposed between the first and second bodies of the cathode.

19. The contact start liquid-cooled plasma arc cutting torch of claim 18, wherein the electrical contact comprises a canted coil spring.

20. The contact start liquid-cooled plasma arc cutting torch of claim 18, wherein the electrical contact is configured to pass all of a pilot arc current between the first and second bodies during a pilot arc mode of torch operation.

* * * * *